United States Patent
Bin Hashim et al.

(10) Patent No.: US 12,346,365 B2
(45) Date of Patent: Jul. 1, 2025

(54) NOISE REDUCTION AND VALIDATION OF IN-LINE INSPECTION TOOL DATA

(71) Applicant: SAUDI ARABIAN OIL COMPANY, Dhahran (SA)

(72) Inventors: Rida Majed Bin Hashim, Safwa (SA); Hassan Mohammadali Al Matouq, Al Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 11 days.

(21) Appl. No.: 18/317,761

(22) Filed: May 15, 2023

(65) Prior Publication Data

US 2024/0386045 A1    Nov. 21, 2024

(51) Int. Cl.
*G06F 16/35*        (2019.01)
*G06F 16/355*        (2025.01)

(52) U.S. Cl.
CPC ................................ *G06F 16/355* (2019.01)

(58) Field of Classification Search
CPC .................................................... G06F 16/355
See application file for complete search history.

(56) References Cited

U.S. PATENT DOCUMENTS 9,336,484 B1 *   5/2016   Iverson ............... G06F 18/2433
9,804,132 B2   10/2017   Hoyt
2021/0010953 A1 *   1/2021   Adler ..................... G06N 20/00
2022/0120176 A1 *   4/2022   Gutarov ............... E21B 47/024
2023/0306606 A1 *   9/2023   Aichert ............... G06V 10/774

OTHER PUBLICATIONS

Y. Hamed et al., "Error-reduction approach for corrosion measurements of pipeline inline inspection tools", Measurement and Control, 2019, vol. 52(1-2), pp. 28-36 (9 pages).
H. Wang et al., "A Bayesian model framework for calibrating ultrasonic in-line inspection data and estimating actual external corrosion depth in buried pipeline utilizing a clustering technique", Structural Safety, 2015, vol. 54, pp. 19-31 (13 pages).
F. Caleyo et al., "Criteria for performance assessment and calibration of in-line inspections of oil and gas pipelines", Measurement Science and Technology, 2007, vol. 18, No. 7, pp. 1787-1799 (14 pages).

* cited by examiner

*Primary Examiner* — Tony Wu
(74) *Attorney, Agent, or Firm* — Osha Bergman Watanabe & Burton LLP

(57) ABSTRACT

Methods and systems for denoising inline inspection tool data that include obtaining inline inspection tool data including a first plurality of data points with, at least, a first target attribute and a first clustering attribute. The methods and systems further include receiving archival data. Further, the method and systems include iteratively applying the following steps until an acceptance criterion is met. Assigning, by a clustering algorithm, each data point in the first plurality and archival data to a cluster. Subtracting a center of each of the one or more clusters from the first target attribute of each data point. Constructing one or more subsets, determining a subset score, and adjusting a first weight. The method further includes determining a first target attribute average for each of the one or more clusters and assigning the first target attribute to the first target attribute average.

18 Claims, 13 Drawing Sheets

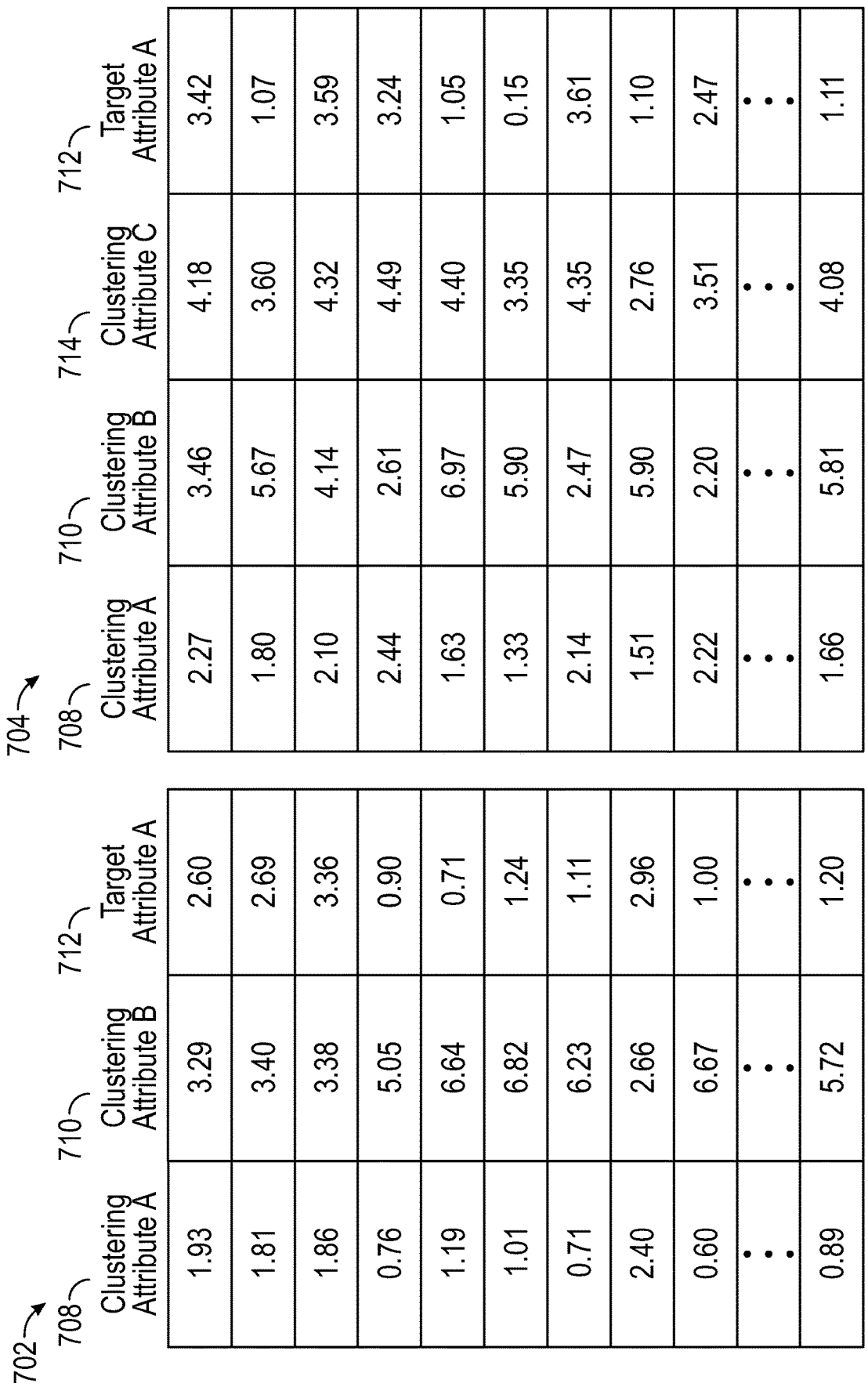

702 ↴

| 708 ↴ Clustering Attribute A | 710 ↴ Clustering Attribute B | 804 ↴ Cluster Assignment | 806 ↴ Reconstructed Target Attribute A |
|---|---|---|---|
| 1.93 | 3.29 | 1 | 2.92 |
| 1.81 | 3.40 | 1 | 2.92 |
| 1.86 | 3.38 | 1 | 2.92 |
| 0.76 | 5.05 | 2 | 0.97 |
| 1.19 | 6.64 | 2 | 0.97 |
| 1.01 | 6.82 | 2 | 0.97 |
| 0.71 | 6.23 | 2 | 0.97 |
| 2.40 | 2.66 | 1 | 2.92 |
| 0.60 | 6.67 | 2 | 0.97 |
| ⋮ | ⋮ | ⋮ | ⋮ |
| 0.89 | 5.72 | 2 | 0.97 |

FIG. 8

NOISE REDUCTION AND VALIDATION OF IN-LINE INSPECTION TOOL DATA

BACKGROUND

In the oil and gas industry, corrosion continually affects the production tubing, casings, and pipelines associated with wells. The corrosion stems from chemical, electrochemical, and mechanical processes and requires costly repair and maintenance operations to prevent loss of produced hydrocarbons. If left unchecked, corrosion may result in the abandonment of a well or the unscheduled shutdown of gas processing plants and/or other upstream and downstream activities. Therefore, to properly maintain a pipeline, reduce repair and maintenance costs, and prevent unscheduled downtime, the integrity of the pipeline and its surrounding systems must be assessed.

To assess the integrity of a pipeline and inform well development and production plans, among other activities, various inline inspection tools and methods have been developed. Conventionally used corrosion inspection tools may include ultrasonic tools, electromagnetic (EM) tools, and magnetic flux leakage (MFL) tools. While each of these tools may provide a useful indication of corrosion or defects in a pipeline, their measurements are often plagued with noise which prevents an accurate assessment of the condition of the pipeline.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method for denoising inline inspection tool data. The method includes obtaining inline inspection tool data including a first plurality of data points where each data point in the first plurality of data points includes a first target attribute and a first clustering attribute. The method further includes receiving archival data including a second plurality of data points where each data point in the second plurality of data points includes the first clustering attribute and receiving a first weight for the first clustering attribute. Further, the method includes iteratively applying the following steps until an acceptance criterion is met. The steps include: assigning, by a clustering algorithm, each data point in the first and second pluralities of data points to a cluster of one or more clusters based on the first clustering attribute and the first weight; subtracting a center of each of the one or more clusters from the first target attribute of each data point in the first plurality of data points, according to the respective cluster of each data point in the first plurality of data points, forming a plurality of differences; constructing one or more subsets from the plurality of differences; determining, at least, a subset score and a number of outliers for each of the one or more subsets; and adjusting the first weight based on the subset score and the number of outliers of each of the one or more subsets. The method further includes determining a first target attribute average for each of the one or more clusters and assigning the first target attribute for each data point in the first plurality of data points to the first target attribute average according to the cluster to which each data point is assigned.

Embodiments disclosed herein generally relate to a non-transitory computer-readable memory that contains computer-executable instructions stored thereon that, when executed on a processor, cause the processor to perform the following steps. The steps include obtaining inline inspection tool data including a first plurality of data points where each data point in the first plurality of data points includes a first target attribute and a first clustering attribute and receiving archival data including a second plurality of data points where each data point in the second plurality of data points includes the first clustering attribute. The steps further include receiving a first weight for the first clustering attribute and iteratively performing the following actions until meeting an acceptance criterion. The actions include: assigning, by a clustering algorithm, each data point in the first and second pluralities of data points to a cluster of one or more clusters based on the first clustering attribute and the first weight; subtracting a center of each of the one or more clusters from the first target attribute of each data point in the first plurality of data points, according to the respective cluster of each data point in the first plurality of data points, forming a plurality of differences; constructing one or more subsets from the plurality of differences; determining, at least, a subset average and a number of outliers for each of the one or more subsets; and adjusting the first weight based on the subset average and the number of outliers of each of the one or more subsets. The steps further include determining a first target attribute average for each of the one or more clusters and assigning the first target attribute for each data point in the first plurality of data points to the first target attribute average according to the cluster to which each data point is assigned.

Embodiments disclosed herein generally relate to a system that includes an inline inspection tool, a well integrity management system, a pipe, and a computer with one or more computer processors and a non-transitory computer readable medium configured to perform the following steps. The steps include obtaining inline inspection tool data from the inline inspection tool upon traversing the pipe, the inline inspection tool data including a first plurality of data points where each data point in the first plurality of data points includes a first target attribute and a first clustering attribute. The steps further include receiving archival data including a second plurality of data points where each data point in the second plurality of data points includes the first clustering attribute, receiving a first weight for the first clustering attribute, and iteratively performing the following actions until meeting an acceptance criterion. The actions include: assigning, by a clustering algorithm, each data point in the first and second pluralities of data points to a cluster of one or more clusters based on the first clustering attribute and the first weight; subtracting a center of each of the one or more clusters from the first target attribute of each data point in the first plurality of data points, according to the respective cluster of each data point in the first plurality of data points, forming a plurality of differences; constructing one or more subsets from the plurality of differences; determining, at least, a subset average and a number of outliers for each of the one or more subsets; and adjusting the first weight based on the subset average and the number of outliers of each of the one or more subsets. The steps further include determining a first target attribute average for each of the one or more clusters and assigning the first target attribute for each data point in the first plurality of data points to the first target attribute average according to the cluster to which each data point is assigned.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

FIG. 7A depicts example inline inspection tool data in accordance with one or more embodiments.

FIG. 7B depicts an example dataset in accordance with one or more embodiments.

FIG. 8 depicts aspects of example inline inspection tool data in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

Figure 1A:
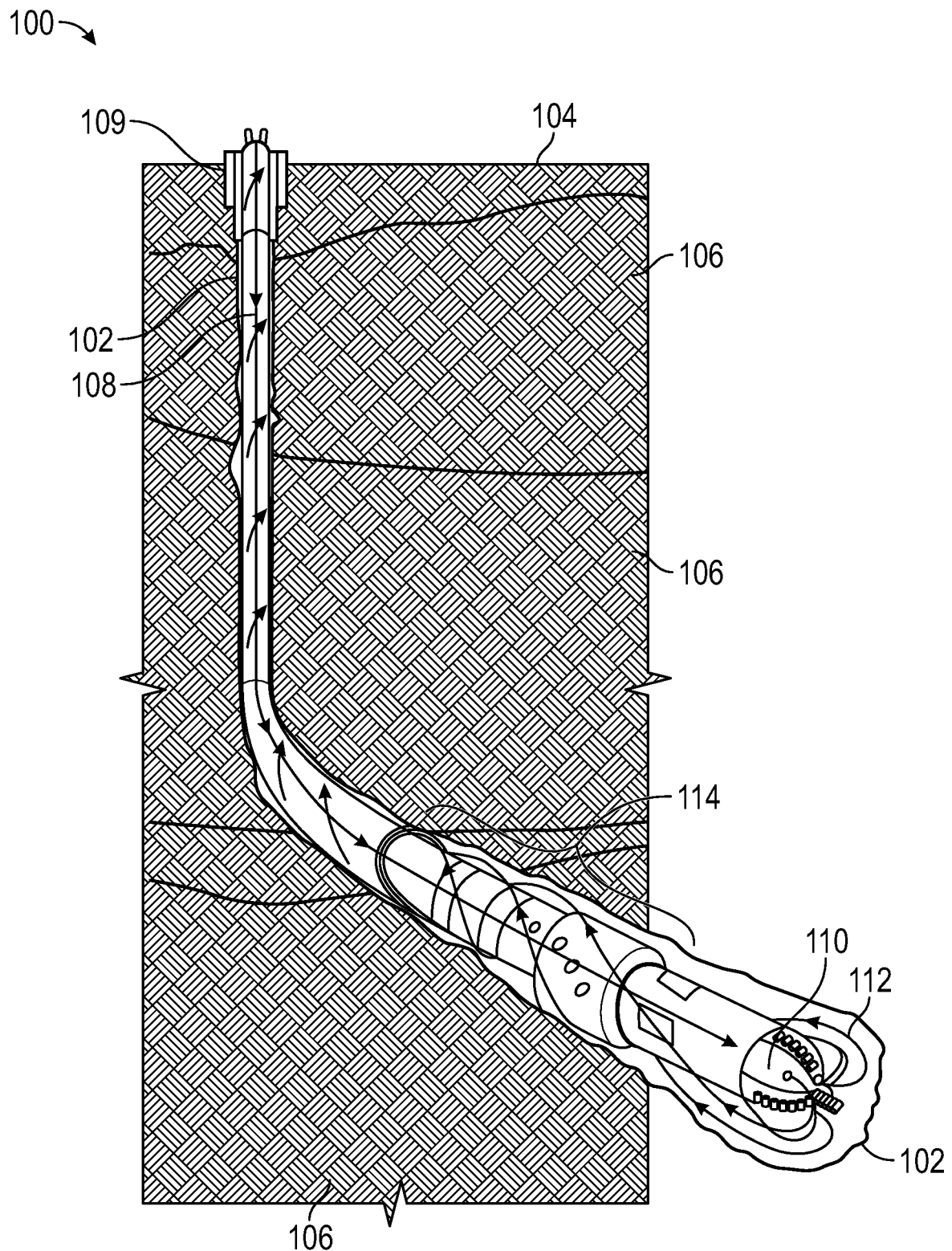
FIG. 1A depicts the drilling of a wellbore in accordance with one or more embodiments.

A general overview of the subsurface activities associated with a drilling process are provided in FIG. 1A. For brevity, above surface equipment, or other offshore rig platform and equipment, used in a drilling operation are not depicted as well sites may be configured in many ways. However, exclusion of well site configurations should not be considered limiting as the tools and methods described herein are invariant to well site configurations. As seen, a drilling operation at a well site may include drilling a wellbore (102) into a subsurface region (106) including various formations to access one or more sources of hydrocarbons (i.e., reservoirs). To drill a new section of wellbore (102), typically, a drill bit (110) with drilling fluid nozzle is connected to the down-hole end of a drill string (108), which is a series of drill pipes connected to form a conduit, that is rotated from the surface (104) while pushing the drill bit (110) against the rock forming a wellbore (102) in the ground and through the subsurface (106). In some implementations, the drill bit (110) may be rotated by a combined effect of surface rotation and with a down-hole drilling motor (not shown).

While cutting rock with a drill bit (110), typically, a drilling fluid (112) is circulated (with a pump) through the drill string (108), out of the drilling fluid nozzle of the drill bit (110), and back to the surface (104) through the substantially annular space between the wellbore (102) and the drill string (108). Moreover, the drill string (108) may contain a bottom hole assembly (BHA) (114) disposed at the distal end, or down-hole portion, of the conduit. To guide the drill bit (110), monitor the drilling process, and collect data about the subsurface (106) formations, among other objectives, the BHA (114) of the drill string (108) may be outfitted with "logging-while-drilling" (LWD) tools, "measurement-while-drilling-tools" (MWD), and a telemetry module. An MWD or LWD tool is generally a sensor, or measuring device, which collects information in an associated log during the drilling process. The measurements and/or logs may be transmitted to the surface (104) using any suitable telemetry system known in the art. The BHA (114) and the drill string (108) may contain other drilling tools known in the art but not specifically stated. By means of example, common logs, or information collected by LWD tools, may include, but are not limited to, the density of the subsurface (106) formation, the effective porosity of the subsurface (106) formation, and temperature.

Depending on the depth of a hydrocarbon bearing formation and other geological complexes, a well can have several hole sizes before it reaches its target depth. A steel pipe, or casing (109), may be lowered in each hole and a cement slurry may be pumped from the bottom up through the substantially annular space between the casing (109) and the wellbore (102) to fix the casing (109), and seal the wellbore (102) from the surrounding subsurface (106) formations. Upon finishing drilling the wellbore (102), the well may undergo a completions process to facilitate accessibility to the well and access the desired hydrocarbons. In some implementations, the final wellbore (102) can be completed using either cased and cemented pipe, which is later perforated to access the hydrocarbon, or it may be completed using a multi-stage open-hole packers assembly. Further, production tubing may be used to transport hydrocarbons from one or more reservoirs in the subsurface (106) formations to the surface (104).

Figure 1B:
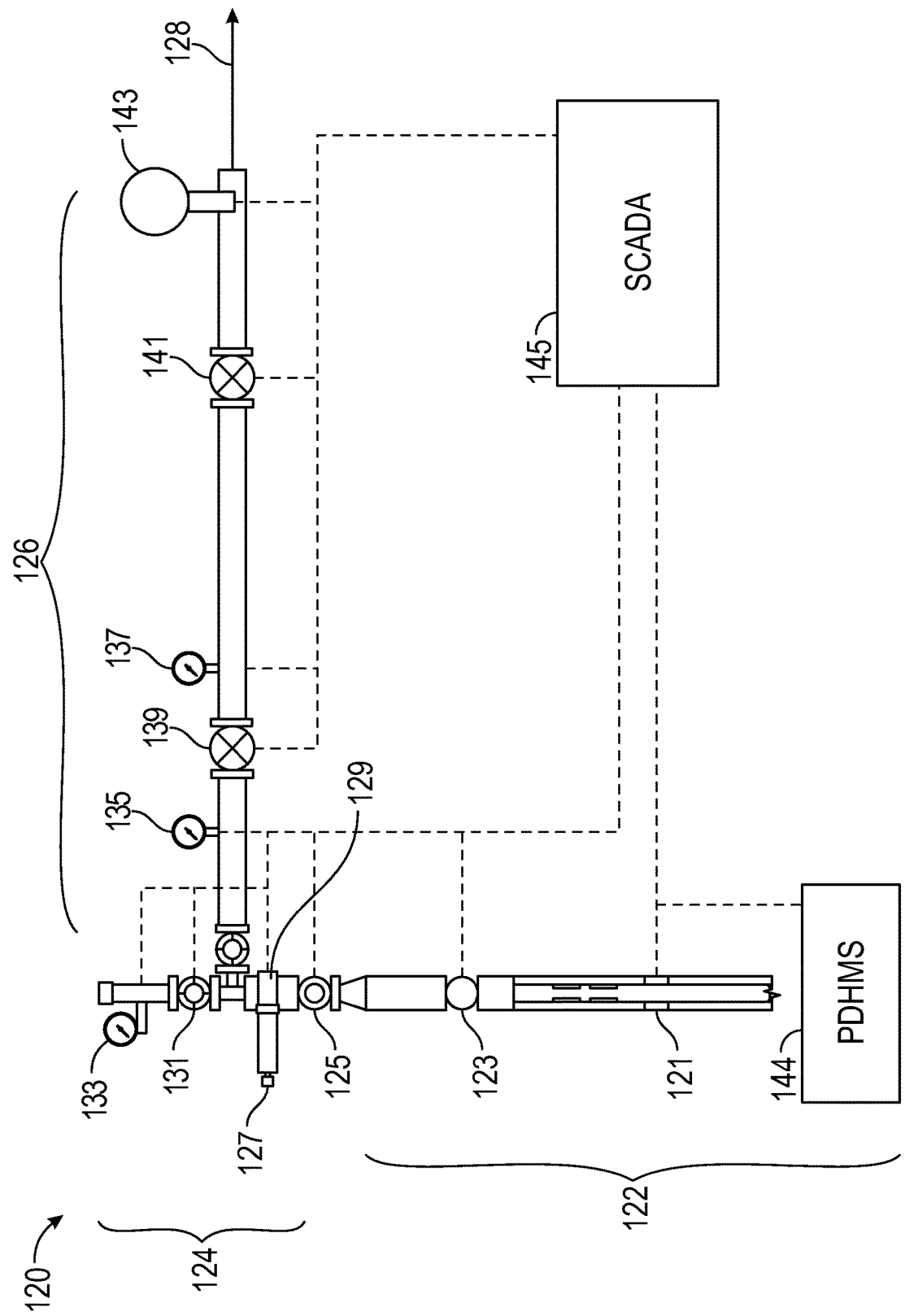
FIG. 1B depicts a pipeline in accordance with one or more embodiments.

In accordance with one or more embodiments, FIG. 1B depicts a simplified portion of a pipeline (120) of a multilateral well in an oil and gas field. Herein, an oil and gas field is broadly defined to consist of wells which produce at least some oil and/or gas. Hydrocarbon wells typically produce oil, gas, and water in combination. The relative amounts of oil, gas, and water may differ between wells and vary over any one well's lifetime.

For clarity, the pipeline (120) is divided into three sections; namely, a subsurface (122) section, a tree (124) section, and a flowline (126) section. It is emphasized that pipelines (120) and other components of wells and, more generally, oil and gas fields may be configured in a variety of ways. As such, one with ordinary skill in the art will appreciate that the simplified view of FIG. 1B does not impose a limitation on the scope of the present disclosure. As part of the subsurface (122) section, FIG. 1B shows an inflow control valve (ICV) (121). An ICV (121) is an active component usually installed during well completion. The ICV (121) may partially or completely choke flow into a well. Generally, multiple ICVs (121) are installed along the reservoir section of a wellbore. Each ICV (121) is separated from the next by a packer. Each ICV (121) can be adjusted and controlled to alter flow within the well and, as the reservoir depletes, prevent unwanted fluids from entering the wellbore. The subsurface (122) section of the pipeline (120) has a subsurface safety valve (SSSV) (123). The SSSV (123) is designed to close and completely stop flow in the event of an emergency. Generally, an SSSV (123) is designed to close on failure. That is, the SSSV (123) requires a signal to stay open and loss of the signal results in the closing of the valve. Also shown as part of the subsurface (122) section is a permanent downhole monitoring system (PDHMS) (144). The PDHMS (144) consists of a plurality of sensors, gauges, and controllers to monitor subsurface flowing and shut-in pressures and temperatures. As such, a PDHMS (144) may indicate, in real-time, the state or operating condition of subsurface equipment and the fluid flow.

Turning to the tree (124) section of FIG. 1B, a master valve (MV) (125), a surface safety valve (SSV) (127), and a wing valve (WV) (129) are depicted. The MV (125) controls all flow from the wellbore. For safety considerations, a MV (125) is usually considered so important that two master valves (MVs) (second not shown) are used wherein one acts as a backup. Like unto the SSSV (123), the SSV (127) is a valve installed on the upper portions of the wellbore to provide emergency closure and stoppage of flow. Again, SSVs (127) are designed to close on failure. One or more WVs (129) may be located on the side of the tree (124) section, or on temporary surface flow equipment (not shown). WVs (129) may be used to control and isolate production fluids and/or be used for treatment or well-control purposes.

Also shown in FIG. 1B is a control valve (CV) (131) and a pressure gauge (PG) (133). The CV (131) is a valve that controls a process variable, such as pressure, flow, or temperature, by modulating its opening. The PG (133) monitors the fluid pressure at the tree (124) section.

Turning to the flowline (126) section, the flowline (126) transports (128) the fluid from the well to a storage or processing facility (not shown). A choke valve (139) is disposed along the flowline (126). The choke valve (139) is used to control flow rate and reduce pressure for processing the extracted fluid at a downstream processing facility. In particular, effective use of the choke valve (139) prevents damage to downstream equipment and promotes longer periods of production without shut-down or interruptions. The choke valve (139) is bordered by an upstream pressure transducer (135) and a downstream pressure transducer (137) which monitor the pressure of the fluid entering and exiting the choke valve (139), respectively. The flowline (126) shown in FIG. 1B has a block and bleed valve system (141) which acts to isolate or block the flow of fluid such that it does not reach other downstream components. The flowline (126) may be configured with a multiphase flow meter (MPFM) (143). The MPFM (143) monitors the flow rate of fluid by constituent. That is, the MPFM (143) may detect the instantaneous amount of gas, oil, and water. As such, the MPFM (143) indicates percent water cut (% WC) and the gas-to-oil ratio (GOR). Additionally, the MPFM (143) may measure pressure and fluid density.

The various valves, pressure gauges and transducers, sensors, and flow meters depicted in FIG. 1B may be considered devices of an oil and gas field. As shown, these devices may be disposed both above and below the surface of the Earth. These devices are used to monitor and control components and sub-processes of an oil and gas field. It is emphasized that the plurality of oil and gas field devices depicted in FIG. 1B are non-exhaustive. Additional devices, such as electrical submersible pumps (ESPs) (not shown) may be present in an oil and gas field with their associated sensing and control capabilities. For example, an ESP may monitor the temperature and pressure of a fluid local to the ESP and may be controlled through adjustments to ESP speed or frequency.

The plurality of oil and gas field devices may be distributed local to the sub-processes and associated components, global, connected, etc. The devices may be of various control types, such as a programmable logic controller (PLC) or a remote terminal unit (RTU). For example, a programmable logic controller (PLC) may control valve states, pipe pressures, warning alarms, and/or pressure releases throughout the oil and gas field. In particular, a programmable logic controller (PLC) may be a ruggedized computer system with functionality to withstand vibrations, extreme temperatures, wet conditions, and/or dusty conditions, for example, around a pipeline (120). With respect to an RTU, an RTU may include hardware and/or software, such as a microprocessor, that connects sensors and/or actuators using network connections to perform various processes in the automation system. As such, a distributed control system may include various autonomous controllers (such as remote terminal units) positioned at different locations throughout the oil and gas field to manage operations and monitor sub-processes. Likewise, a distributed control system may include no single centralized computer for managing control loops and other operations.

In accordance with one or more embodiments, FIG. 1B depicts a supervisory control and data acquisition (SCADA) system (145). A SCADA system (145) is a control system that includes functionality for device monitoring, data collection, and issuing of device commands. The SCADA system (145) enables local control at an oil and gas field as well as remote control from a control room or operations center. To emphasize that the SCADA system (145) may monitor and control the various devices of an oil and gas field, dashed lines connecting the plurality of oil and gas field devices to the SCADA system (145) are shown in FIG. 1B.

While the pipeline (120) of FIG. 1B is depicted as being associated with a production well, it is emphasized that embodiments of the instant disclosure are not limited to a type of pipeline. As will be shown, embodiments disclosed herein may be applied to any pipeline, such as those associated with a gas processing plant, and/or pipelines to transport fluids (such as hydrocarbon streams) to and from various locations.

Throughout the lifetime of a well, corrosion continually affects the production tubing, casings, and pipelines associated with the well. The corrosion stems from chemical, electrochemical, and mechanical processes and requires costly repair and maintenance operations to prevent the loss of produced hydrocarbons. If left unchecked, corrosion may result in negative environmental impacts and/or the abandonment of a pipeline. To properly maintain a pipeline, reduce repair and maintenance costs, mitigate negative environmental impacts, and prevent unscheduled downtime, the integrity of the pipeline must be assessed.

Similarly, corrosion continually affects any conduit carrying a hydrocarbon stream. Again, the corrosion stems from chemical, electrochemical, and mechanical processes and requires costly repair and maintenance operations to prevent damage to the conduit. If left unchecked, corrosion may result in costly unscheduled repairs and the stoppage of upstream and/or downstream activities.

To assess the integrity of a pipeline and inform well development and production plans, various corrosion inspection tools and methods have been developed. Conventionally used corrosion inspection tools may include ultrasonic tools, electromagnetic (EM) tools and magnetic flux leakage (MFL) tools. While each of these tools may provide a useful indication of corrosion, they are each limited in their inspection capabilities.

EM inspection tools, for example, measure the response of a transmitted electromagnetic field using one or more on-board receivers. An EM inspection tool may be deployed at various locations in a pipeline (e.g., at various depths in a wellbore (102)) and the response is evaluated to produce a measurement of corrosion in the pipeline. Here, it is noted that the term depth refers to the distance along the wellbore (102) and does not necessarily correspond with the orthogonal distance from the surface (104) where the orthogonal distance is measured along an axis oriented perpendicular to the surface (104), also known as the true vertical depth. By way of example, a portion of a wellbore (102) may be oriented horizontally, or parallel to the surface (104), such that its orthogonal distance remains fixed over the horizontal portion, however, the depth measures the distance along the wellbore (102) and is not stagnant over any horizontal portion of the wellbore (102). Additionally, the depth is continuous and strictly monotonically increasing as directed from the surface (104) to the most down-hole portion of the wellbore (102) even if the orthogonal distance, or true vertical depth, decreases.

Similarly, a MFL tool may be deployed at various locations in a pipeline while producing a magnetic field and measuring a response. The response is evaluated to produce a measurement of corrosion in the pipeline. More specifically, the tool produces a magnetic field in the wall(s) of the surrounding pipeline and flaws (i.e., corrosion, defects) are detected in the surrounding pipeline through analysis of perturbations in the magnetic field caused by the flaws. In general, a MFL tool carries magnets to induce the magnetic field and sensor assemblies to monitor the magnetic flux density changes caused by flaws in the surrounding pipeline. The sensor assemblies are usually circumferentially distributed about a central axis of the tool. A MFL tool also has a processing canister consisting of a data processor and data storage, a power supply, and other inspection devices such as cathodic protection current and distance measurement sensors.

Figure 2A:
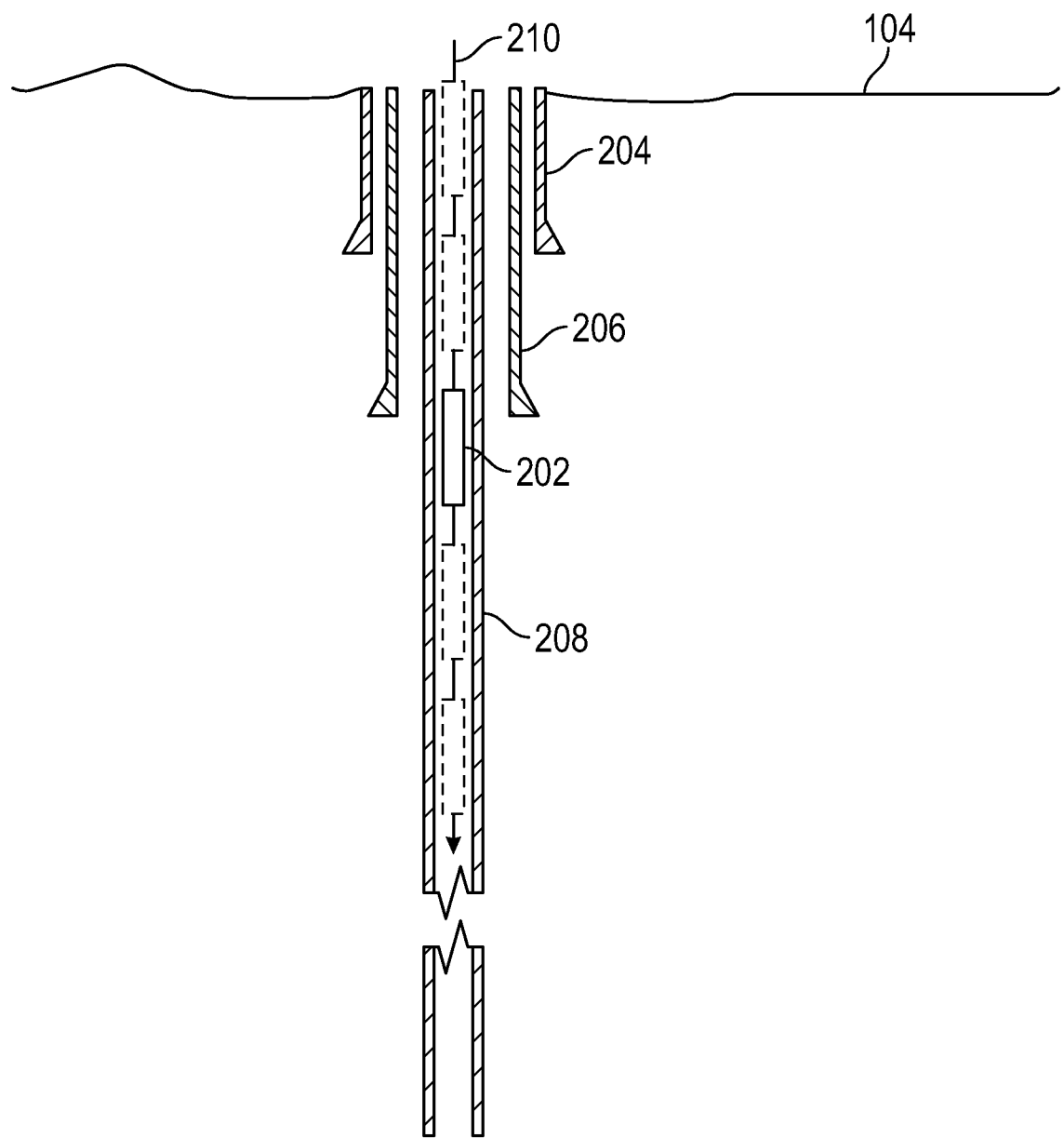
FIG. 2A depicts an inline inspection tool traversing through a wellbore in accordance with one or more embodiments.
Figure 2B:
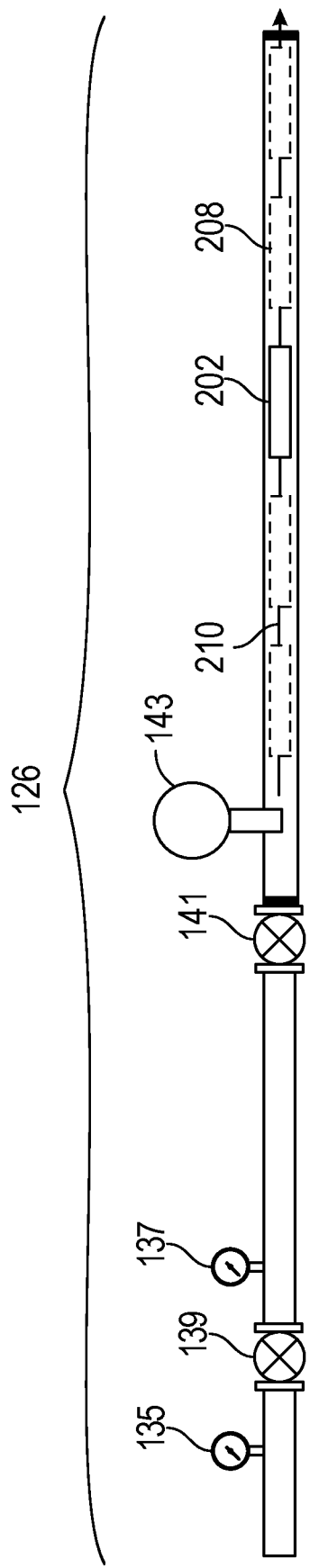
FIG. 2B depicts an inline inspection tool traversing through a pipeline in accordance with one or more embodiments.

Hereafter, a tool that can measure the corrosion or defects of one or more pipes is referred to as an inline inspection tool (e.g., EM tool, MFL tool). FIG. 2A depicts an inline inspection tool (202), such as an MFL tool, descending in a well. However, it is noted that the inline inspection tool (202) is not limited to well inspection but may be used to inspect any pipe, for example, the flowline of FIG. 1B. To this end, an example of an inline inspection tool (202) traversing a pipe (e.g., the flowline (126)) is depicted in FIG. 2B and described below. In the example of FIG. 2A, the well has an outer casing (204), an inner casing (206), and production tubing (208). One with ordinary skill in the art will recognize that a well may be configured in a variety of ways and that the instant disclosure is not limited to the depiction of FIG. 2A. Further, it is noted that production tubing (208), casings (204, 206), and pipelines associated with a well may all be more generally described as pipes. For concision, the term pipe will be adopted herein to represent any number of pipes that may surround an inline inspection tool (202), such as a MFL tool, at any given depth in the well. For example, in FIG. 2A, depending on the depth of the inline inspection tool (202), the inline inspection tool (202) may be surrounded by only production tubing (208), production tubing (208) and the inner casing (206), or production tubing (208), inner casing (206), and outer casing (204). In all cases, the surrounding conduit(s) detected by the inline inspection tool (202) will be referred to as pipe. That is, the term pipe, although conventionally singular, may refer to more than one pipe. FIG. 2A further depicts the inline inspection tool (202) progression with a directed arrow (210) and dashed outlines intended to indicate tool movement. In accordance with one or more embodiments, the inline inspection tool (202) enters the well from the surface (104) and is lowered into the well. While FIG. 2A depicts the inline inspection tool (202) descending in a well, one with ordinary skill in the art will recognize that the inline inspection tool (202) is not limited to this activity. In general, an inline inspection tool (202) can be used to inspect any pipe, such as a pipeline that carries a fluid (e.g., pipeline from well to oil and gas processing plant).

FIG. 2B depicts an inline inspection tool (202) traversing and inspecting the flowline (126) section of a pipeline (120). Like FIG. 2A, FIG. 2B depicts the inline inspection tool (202) progression with a directed arrow (210) and dashed outlines intended to indicate tool movement. Again, while the inline inspection tool (202) is visualized in FIG. 2B as traversing a flowline extending from a well, in general, the inline inspection tool (202) may be used to inspect any pipe.

Figure 3:
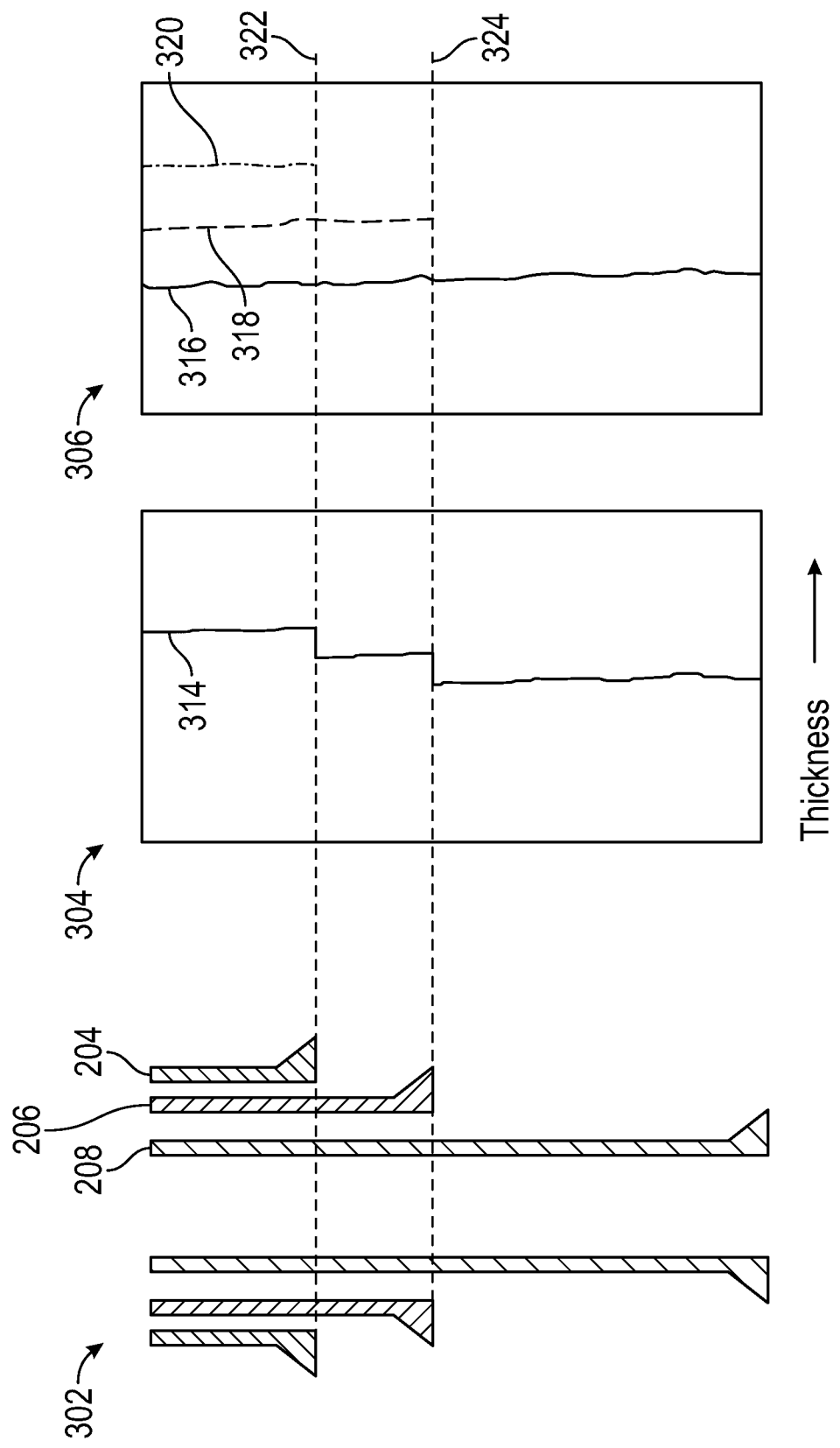
FIG. 3 depicts detected thickness profiles using an inline inspection tool in accordance with one or more embodiments.

FIG. 3 depicts examples of results that may be obtained using an inline inspection tool (202). In accordance with one or more embodiments, the measurements (e.g., sensed magnetic field) of an inline inspection tool (202) are used to determine the total or average thickness of the surrounding pipe, where reduced thickness indicates the presence of corrosion or defects in the pipe. Current corrosion evaluation methods can generally be categorized as either an aggregate method (304) or individualized method (306). The distinctions in these methods are highlighted by showing their results when an inline inspection tool (202), for example, a MFL tool, is deployed in an example section of wellbore (302). The example section of wellbore (302) has two casings, outer casing (204) and inner casing (206), where each of these casings extends a different depth into the wellbore. The example section of wellbore (302) further depicts production tubing (208). Using an aggregate method (304), an inline inspection tool (202) can indicate the total thickness of all pipes surrounding the wellbore as a function of depth. Under an aggregate method (304), when a casing terminates, the measured total thickness of all pipes (314) is reduced stepwise by the thickness of the terminated casing. In the example of FIG. 3, this stepwise reduction in the total thickness of all casings (314) can be seen at the termination of the outer casing (322) and the termination of the inner casing (324).

When using an individualized method (306), an inline inspection tool (202) (e.g., MFL tool) can indicate the thickness of each of the surrounding pipes (outer casing (204), inner casing (206), and production tubing (208)) distinctly as a function of depth. Using an individualized method (306), FIG. 3 depicts the total thickness of production tubing (208), the total thickness of inner casing (318), and the total thickness of outer casing (320). In the literature, there are multiple publications highlighting the benefits of using an inline inspection tool (202) compatible for use with an individualized method (306) over an aggregate method (304). Principally, the capability to measure the total thickness of individual pipes promotes more proactive well integrity management systems by indicating which pipe is affected by corrosion. Regardless of the method used (aggregate method (304) or individualized method (306)), a major advantage of using an inline inspection tool (202) is that the measured thickness of the surrounding pipes at various depths is not limited to just the innermost pipe as would be the case when using, for example, a caliper-based tool. While an inline inspection tool (202) provides a useful indication of corrosion or defects in a pipe, the quantity measured by the tool is often plagued with noise which prevents an accurate assessment of the condition of the pipe.

In one aspect, embodiments disclosed herein generally relate to a method for reducing the noise of data received from an inline inspection tool (202) and validating that the noise reduction is properly applied. The inline inspection tool (202) may be used to inspect any pipe, for example, the production tubing of a wellbore or surface flowlines for the transportation of hydrocarbon streams. Upon noise reduction and validation, the inline inspection tool data is used to accurately inform well integrity management systems and to create pipeline maintenance and production plans.

Figure 4:
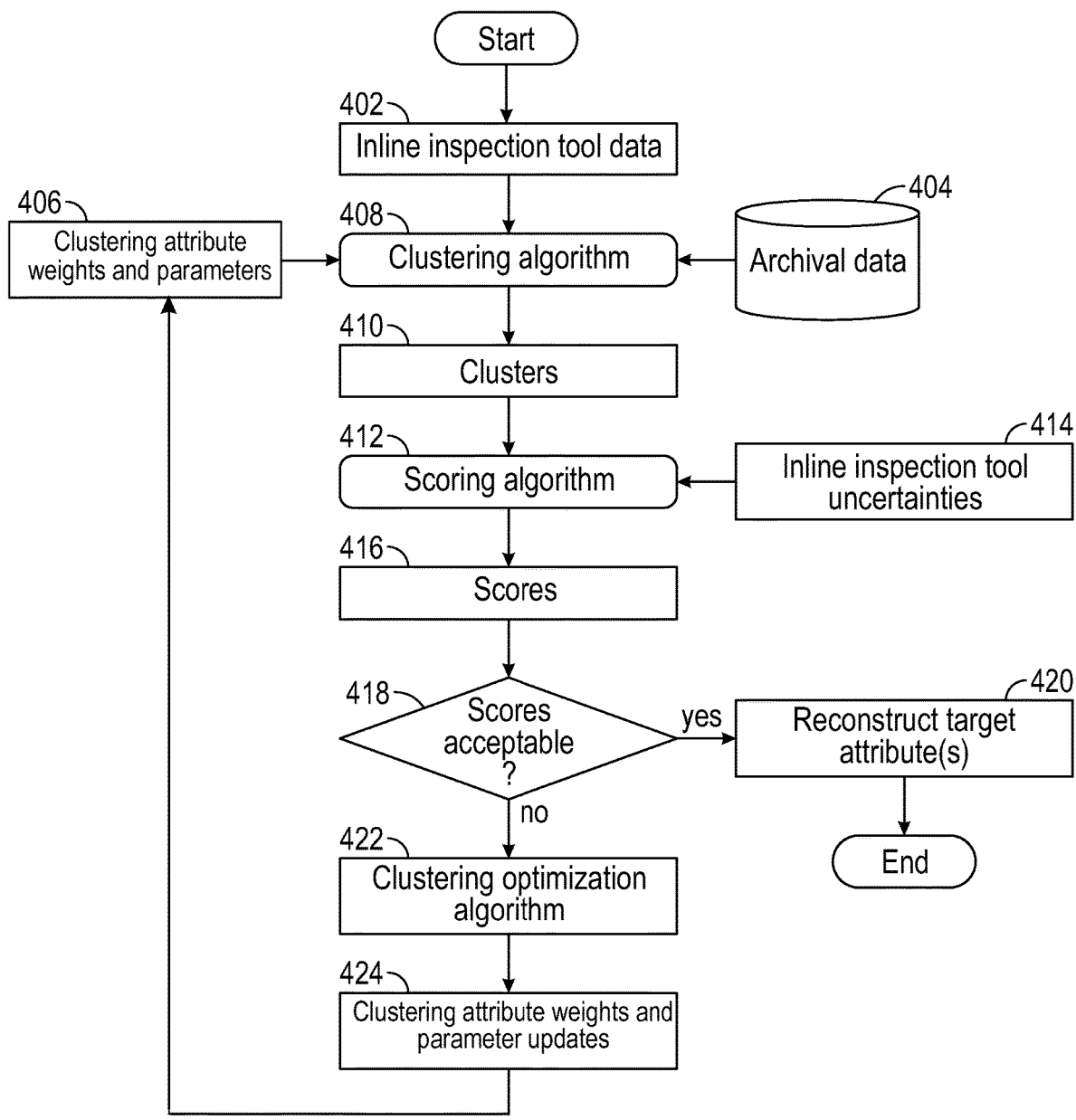
FIG. 4 depicts a flowchart in accordance with one or more embodiments.

In accordance with one or more embodiments, FIG. 4 depicts a high-level flowchart outlining the noise reduction and validation method of the instant disclosure. As seen in FIG. 4, in Block 402 the method begins by collecting inline inspection tool data. In one or more embodiments, the inline inspection tool data is collected using one or more sensors on an inline inspection tool (202) and stored on-board the inline inspection tool (202) with a data storage medium. The inline inspection tool data contains, at least, a measured quantity that indicates, or will be used to indicate, an amount of corrosion or the presence of a defect, in the pipe surrounding the inline inspection tool (202). In one or more embodiments, the inline inspection tool data further includes information, or other measured quantities, indicative of the environment (i.e., physical conditions) of the inline inspection tool (202) as it traverses through a pipe. Quantities that may be sensed by the inline inspection tool (202) and stored in the inline inspection tool data may include, but are not limited to: defect orientation; distance along the pipe; temperature; and flow velocity. In some instances, one or more of the above-listed quantities may be measured using another device. In these cases, quantities measured using devices other than the inline inspection tool (202) may be included in the inline inspection tool data through concatenation, where it is well understood that quantities measured between two or more devices may be aligned (e.g., merged) according to the distance along the pipe. This latter approach allows the inclusion of physical parameters that are not typically collected through inline inspection tools, such as inhibitor concentration, estimated water cut, sulfide concentration, acidity, etc.

The noise reduction and validation method further has access to archival data (404). The archival data (404) includes inline inspection tool data from previous traversals of an inline inspection tool (202), and possibly other tools or devices, through one or more other pipes. That is, the archival data (404) contains historical inline inspection tool data. The archival data (404) pertains to any and all known pipelines, regardless of their condition, and is not necessarily from the same pipe from which the inline inspection tool data was obtained. In one or more embodiments, the archival data (404) is stored on-board the inline inspection tool (202) with a data storage medium.

Each quantity contained in the inline inspection tool data, and the archival data (404), is categorized as either a target attribute or a clustering attribute. Quantities relating to the environment, or physical conditions, of a pipe are typically classified as clustering attributes (e.g., temperature, distance along the pipe, flow velocity, etc.). Quantities on which noise reduction is desired are classified as target attributes. Using an MFL tool as an example, the recorded magnetic field data is classified as a target attribute. That is, in this example, because the recorded magnetic field data relates to the corrosion or defects of a pipe, it is desired to reduce the noise in the magnetic field data to more accurately determine the condition of the pipe.

Each clustering attribute is associated with a clustering attribute weight. In one or more embodiments, the clustering attribute weight is akin to a scaling parameter. For example, the values associated with a clustering attribute may be normalized according to the relationship:

$$NV = w_{attriubte} \frac{\text{value} - \min(\text{values})}{\max(\text{values}) - \min(\text{values})},$$

where $w_{attribute}$ is the clustering attribute weight, the term values represents all of the observed values in the datasets considered for the clustering attribute under consideration, value is a single clustering attribute value being processed (i.e., normalized) and NV is the resulting normalized value. The rationale for the clustering attribute weight will be described in greater detail later in the instant disclosure. The noise reduction and validation method has access to the clustering attribute weights, as depicted in Block 406. As will be described, the clustering attribute weights define the relative importance of each clustering attribute during a clustering operation. In one or more embodiments, the clustering attribute weights, one for each clustering attribute of the inline inspection tool data, are initialized to a value of one and may be updated (or altered) during the noise reduction and validation method.

Continuing with FIG. 4, the inline inspection tool data, archival data (404), and clustering attribute weights are processed by a clustering algorithm in Block 408. Any suitable clustering algorithm known in the art may be employed without departing from the scope of this disclosure. For example, the clustering algorithm may be a density-based algorithm, distribution-based algorithm, hierarchical-based algorithm, or a mixture model. In one or more embodiments, the clustering algorithm is the K-means algorithm. Depending on the clustering algorithm used, the number of clusters may be specified or may be learned by the algorithm. In one or more embodiments, two or more number of clusters are specified and the optimal number of clusters is selected according to an evaluation method, such as the elbow method or silhouette method.

The inline inspection tool data and the archival data (404) each contain a plurality of data points and each data point contains values for one or more target attributes and one or more clustering attributes. In Block 408, the clustering algorithm forms clusters of the data points based on the clustering attributes. That is, while an intent of the noise reduction and validation method disclosed herein is to reduce the noise of the target attribute(s) in the inline inspection tool data, clusters are identified and formed by the clustering algorithm while considering only the clustering attributes. As previously stated, each clustering attribute is associated with a clustering attribute weight. In accordance with one or more embodiments, the clustering algorithm is configured to accept clustering attribute weights or the data points are normalized according to the clustering attribute weights. The clustering attribute weights are used by the clustering algorithm to assign a relative priority to the clustering attributes when forming the clusters of data points. In accordance with one or more embodiments, the clustering algorithm is further configured to locally shift data points according to a parameterized function, where the parameters of the function may be learned, or determined, through optimization of an objective function. Likewise, the clustering attribute weights may be altered, or determined, through optimization of the objective function. The objective function and the rationale for locally shifted data points is described in greater detail below.

The purpose of the clustering algorithm is to identify groups of data points acquired from physically similar regions of pipe. As such, only clustering attributes, which as previously stated are those related to the environment or physical conditions of the pipe, are considered by the clustering algorithm. Again, clustering attributes may include, but are not limited to, measurements of: defect orientation; distance along the pipe; temperature; inhibitor concentration; estimated water cut; sulfide concentration; acidity; and flow velocity. Each of these factors affects corrosion growth differently, and thus can be utilized to cluster physically similar regions of pipe. In addition to these known factors, there are unknown conditions that could affect corrosion, such as improper coating in a certain area. These unknown factors are not an issue, however, as the distance along the pipeline can serve as an adequate proxy. This is because it can be assumed that the physical condition of the pipe can change along the distance of the pipe without the need to explicitly specify the reason for the change. Therefore, regardless of the cause of change along the distance, it can still be captured during the clustering.

Continuing with FIG. 4, the clustering algorithm outputs one or more clusters of data points depicted in Block 410. As will be described in greater detail below, the assignment of data points to clusters is scored by a scoring algorithm in Block 412 which outputs scores (Block 416) for various subsets of the inline inspection tool data. The scoring algorithm has access to and makes use of inline inspection tool uncertainties depicted in Block 414. The inline section tool uncertainties contains the measurement accuracy and tool specifications for the measuring devices and/or sensors used to measure and record the target attributes of the inline inspection tool data. In one or more embodiments, the inline inspection tool uncertainties may further include the measurement accuracy and/or tool specification for devices and/or sensors associated with the clustering attributes. For example, in one or more embodiments, a temperature sensor may be disposed on the inline inspection tool (202) to record the local temperature as the inline inspection tool (202) traverses through a pipe. The temperature sensor may have a known random error distribution. Typically, the random error distribution is specified by a variance. Thus, in this example, the inline inspection tool uncertainties of Block 414 contains the known variance of the temperature sensor. In accordance with one or more embodiments, the inline inspection tool uncertainties include the variance for each measurement device or sensor associated with a clustering attribute and the target attribute.

The scores (Block 416), one for each subset of inline inspection tool data, produced by the scoring algorithm in Block 412, are compared to a user-defined acceptance criterion (e.g., a threshold) to determine if each score is acceptable in Block 418. If, in Block 418, each score meets the user-defined acceptance criterion and is deemed acceptable, then the target attribute(s) is reconstructed in Block 420. While the clusters of data points were formed by the clustering algorithm in Block 408 while only considering the clustering attributes, the data points still each contain one or more target attributes. For each cluster, the average of each of the one or more target attributes is determined. In Block 420, reconstruction of the target attribute(s) simply consists of identifying to which cluster each of the data points of the inline inspection tool data (402) resides and replacing its target attribute(s) with the average target attribute(s) value of its respective cluster. In other words, the target attribute values are averaged over similar data points where the similarity of the data points is determined through application of a clustering algorithm considering only the clustering attributes (i.e., clustering according to physical similarity).

However, if in Block 418 one or more of the scores is not acceptable, the noise reduction is not considered validated and the method proceeds to a cluster optimization algorithm in Block 422. In Block 422, the cluster optimization algorithm, based on which scores were not accepted, determines clustering attribute weight updates and updates to the parameters governing the local shift functions depicted in Block 424. That is, the cluster optimization algorithm provides recommended alterations that should be applied to one or more of the clustering attribute weights and the parameters governing the local shift functions. As seen in FIG. 4, in Block 424 the clustering attribute weight updates and local shift function parameters are applied and the clustering algorithm is re-run. The process of running the clustering algorithm to produce clusters, scoring subsets of the data points based on the clusters, and updating the clustering attribute weights and local shift function parameters is repeated until all of the scores are deemed acceptable according to the user-defined acceptance criterion in Block 418.

To explain the rationale for the clustering attribute weights, consider a distance attribute (where distance is the length along the pipeline up to the target attribute location) varying from 0 to 60,000 meters and a corrosion inhibitor concentration attribute varying from 0 ppm to 40 ppm. Both attributes, after an initial normalization using clustering attribute weight equal to 1.0, will vary from 0 to 1, where 1 is equivalent to either a distance of 60,000 meters or a concentration of 40 ppm depending on the attribute considered. The issue with this type of normalization can be made clear once it is known that a significant factor in the determination of whether a point should belong to a cluster is the distance between the point and the centroid of the cluster. For example, consider the situation where there is a cluster whose centroid is at 0.5 in both concentration and distance dimensions. Moreover, there exists a point (point A) corresponding to 40 ppm (1 in the normalized scale) and 30,000 meters (0.5 in the normalized scale). In addition, there is another point (point B) corresponding to 20 ppm (0.5 in the normalized scale) and 60,000 meters (1 in the normalized scale). From the prospective of the cluster, these two points would be equivalent because they are equidistant from its centroid in the normalized scale.

However, the goal of clustering according to the present invention is to identify physically similar points, where physical similarity means that the resulting target attribute should be similar. For instance, if the target attribute is metal loss, then it is expected that two locations experiencing the same velocity, same temperature, same inhibitor concentration, etc. will experience similar metal loss. However, similar deviations within these attributes (e.g. temperature and inhibitor concentration) do not have equivalent effects on the metal loss (target attribute). Therefore, the standard technique of normalization without updating the clustering attribute weights from their initial value of one is not considered optimal where additional enhancements have to be implemented in order to truly capture physically similar points.

Additionally, the use of clustering attribute weights does not capture the differing importance for changes within (or local to) a certain attribute. With simple normalization, or normalization modified by weights, there is an implicit assumption that moving equivalent distances within a dimension leads to equivalent outcomes. Operating within this assumption, from the prospective of a specific cluster, changing a point by 0.50 in the positive direction away from a cluster centroid is equivalent to moving 0.50 in the negative direction for the same dimension. Both changes result in equidistant movements away from the cluster. While some attributes may display this behavior in their physical influence on the target attribute, others may not.

Consider, for instance, the effect of corrosion inhibitor concentration on corrosion rate. An inhibitor may have a non-linear effect on efficiency, where efficiency represents the percentage reduction of the corrosion rate. In such a case, equivalent differences in inhibitor can have a drastically different effects on efficacy dependent on the value of inhibitor.

In accordance with one or more embodiments, local shifts are made to the data points of a clustering attribute by processing (or mapping) the attribute through a local shift function. In one or more embodiments, the behavior of the local shift function is defined by one or more parameters. A unique local shift function can exist for each clustering attribute.

It is noted that the initial parameters for the local shift functions do not need to be initially accurate, as the optimization technique, described below, will make adjustments to the parameters during its operation. For these modifications, a user can assign some limits. For example, it is possible to impose an exponential form for the temperature effect model following an Arrhenius-type equation. Other restrictions and/or limitations can be made, for example, through imposing a strictly increasing model (e.g., for inhibitor concentration), or enforcing a continuous or discrete local shift function. As an example, consider the case where an Arrhenius-type equation is used as a local shift function applied to the clustering attribute of temperature. Such a local shift function is parameterized by two parameters; namely, temperature attribute $W_T$ as well as $E_a$ in the Arrhenius equation as seen in the Equations below that apply both a local shift function parameter and a clustering attribute weight.

$$T_{unscaled\ effect} = e^{\frac{-E_a}{RT}}$$

$$T_{scaled\ effect} = W_T \frac{T_{unscaled\ effect} - T_{unscaled\ effect,min}}{T_{unscaled\ effect,max} - T_{unscaled\ effect,min}}$$

It should be highlighted that for the distance attribute specifically, it is likely optimal to initialize the mapping of all distance values to zero. This is because, for most if not all target attributes, the effect of distance itself cannot be modeled since no effect is expected. However, the presence of distance as an attribute is still useful as it allows capturing localized physical phenomena along the pipeline that are not part of the clustering attributes. For example, it could be the case that the type of soil along the pipeline distance is changing. These different soil types have different effects on the target attribute (e.g., external metal loss due to corrosion). Therefore, by allowing the optimization algorithm to change the effect of distance, it can serve as a proxy for capturing these differences in soil. Other phenomena capturable by distance could include pipeline topology, localized coating damage, localized mechanical damage, etc.

With respect to the clustering optimization algorithm, any multi-objective optimization technique can be utilized for the present invention. However, regardless of the technique utilized, the objective function of the optimization would be to maximize the scores output by the scoring algorithm, which will be detailed later.

Consider, for example, the case where the optimization is based on a genetic algorithm. In such a case, the fitness (objective) function would be the scores obtained, while the phenotypes in the genetic algorithm would be the different clustering attribute weights and parameter values that govern the local shift functions of the clustering attributes. Each solution (set of phenotypes) will be a set of clustering attribute weights and local shift function parameters that can be used by the clustering algorithm to create new clusters and then score these clusters as depicted in FIG. 4. The genetic algorithm will proceed normally from the first generation of solutions to a following generation through crossovers and mutations. This second generation will go through the same process of evaluation as the first. The process will continue from generation to generation until a solution with acceptable scores is obtained.

In the case where no functional form of the attribute local shift function is known (e.g. for inhibitor concentration effect), the optimization algorithm may be allowed to construct its own function. This may be done through a piecewise function, with each piece being modeled as a linear equation. For example, to optimize corrosion inhibitor concentration effect ($C_{scaled\ effect}$), the following function can be used:

$$C_{scaled\ effect} = \begin{cases} m_1 C, & 0 \le C \le 0.5 \\ m_2(C - 0.5) + 0.5 m_1, & 0.5 < C \le 1 \\ m_3(C - 1) + 0.5 m_2 + 0.5 m_1, & 1 < C \le 2 \\ m_4(C - 2) + m_3 + 0.5 m_2 + 0.5 m_1, & 2 < C \le 5 \end{cases}$$

with the following restrictions:

$$3 m_4 + m_3 + 0.5 m_2 + 0.5 m_1 = W_C$$
$$m_1 \ge 0$$
$$m_2 \ge 0$$
$$m_3 \ge 0$$
$$m_4 \ge 0$$

In such a case, the optimization algorithm would be allowed to change the values of $m_1$, $m_2$, $m_3$, $m_4$, and $W_C$.

It should be noted that the piecewise function does not need to be continuous. For example, it is best to allow the distance attribute to be discontinuous, thereby allowing capturing abrupt physical changes along the pipeline distance.

Regardless of whether a piecewise function is continuous, the intervals for each piece in the function can be automatically created using information regarding the present inline inspection tool data. For example, each interval could be restricted to contain a minimum number of data points. This minimum is to allow creating subsets that display statistical properties with higher confidence, which allows scoring these subsets, and thereby allowing optimizing them, as explained in the scoring section. Alternatively, or in addition, a minimum/maximum length for these intervals can be set. This minimum would reduce erratic behavior in the output effect function while the maximum would ensure a satisfactory resolution of the output function. Other restrictions may also be applied.

It is interesting to note that once the optimization is complete, the shape of the resulting (with determined parameters) local shift functions can provide some insight into potential hidden issues within the pipeline. For instance, if there is a sharp increase in the effect at a certain distance, this could be indicative of a localized issue such as coating failure.

Figure 5:
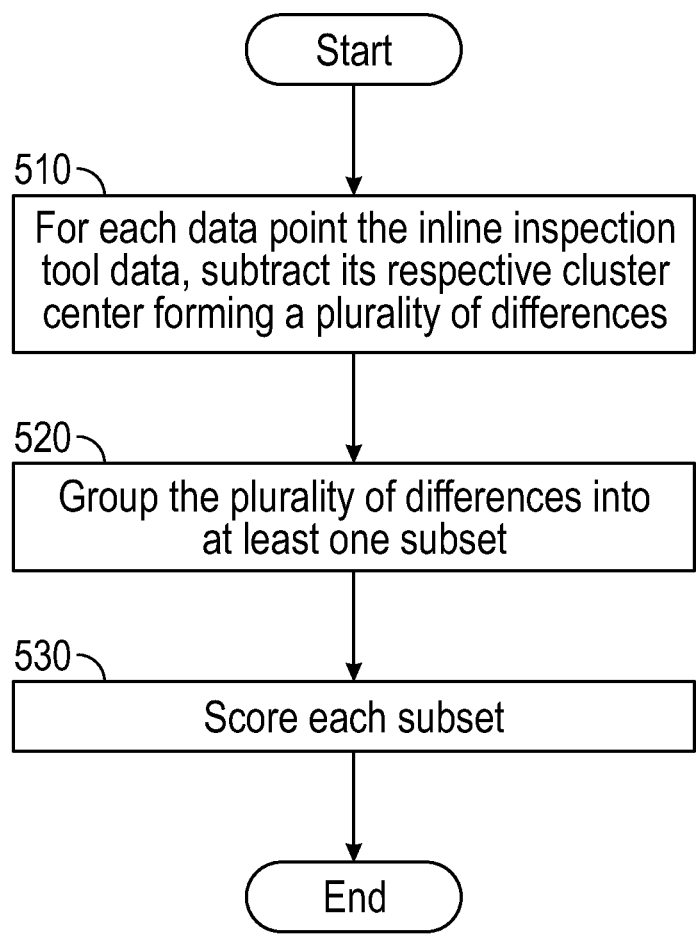
FIG. 5 depicts a flowchart in accordance with one or more embodiments.
Figure 6:
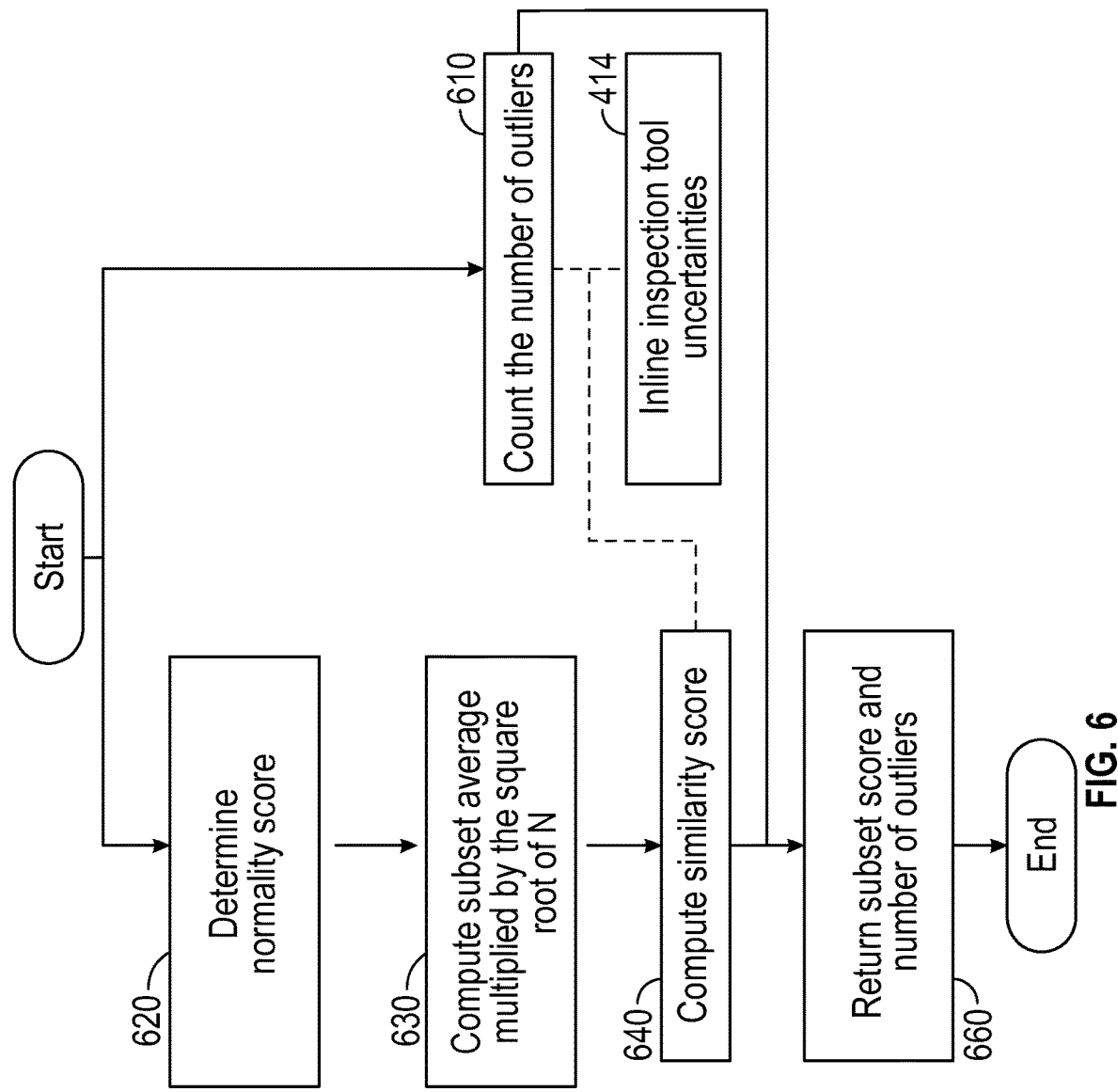
FIG. 6 depicts a flowchart in accordance with one or more embodiments.

FIGS. 5 and 6 depict flowcharts describing processes associated with the formation of subsets of the inline inspection tool data and how these subsets are evaluated by the scoring algorithm, in accordance with one or more embodiments. The processes of FIG. 5 begin after the formation of clusters (Block 410) in FIG. 4. With clusters formed, each data point of the inline inspection tool data is associated with a cluster. As seen in Block 510, for each data point of the inline inspection tool data, the center of its associated cluster is subtracted from the target attribute(s) forming a difference. When each data point of the inline inspection tool data is considered, the collection of differences is herein referred to as a plurality of differences. Note that the plurality of differences is formed purely from the values of the target attribute (even though the target attribute does not contribute to forming the clusters). Depending on the clustering algorithm employed, the cluster center may be an average, centroid, or median of the data points of the cluster, or other defined cluster center. In Block 520, the plurality of differences are grouped to form at least one subset. In accordance with one or more embodiments, a subset is formed for each clustering attribute within a cluster and each clustering attribute (without consideration of cluster assignment). Additional subsets are described in greater detail below. In Block 530, each subset is scored.

FIG. 6 depicts the process of scoring a subset, in accordance with one or more embodiments. As seen in FIG. 6, upon receiving a subset, in Block 610 the number of outlier data points is counted. As previously stated, the scoring algorithm is informed by the inline inspection tool uncertainties. As such, the subset of the plurality of differences being scored can be compared to the expected standard deviation of the associated target attribute, where the standard deviation is known, or can be computed from, the information included in the inline inspection tool uncertainties. In one or more embodiments, an outlier is defined as any difference value that has an absolute value greater than two standard deviations. The number of outliers is returned as part of the scores for the subset in Block 660.

As shown in Block 620, the normality of the subset is tested. Any normality test known in the art may be used to test and/or quantify the normality of the subset. For example, the Shapiro-Wilk test, Pearson's chi-squared test, or the Kolmogorov-Smirnov test may be used without departing from the scope of this disclosure. In one or more embodiments, the result of the normality test is compared to a user-defined statistical confidence threshold. In Block 630 an average value score is computed. The average value score is the average value of the subset multiplied by the square root of N, where N is the number of data points considered in the subset. Thereafter, a similarity score is computed for the subset as shown in Block 640. More details surrounding the similarity score are provided below.

In one or more embodiments, the subset score which will be the objective function of the optimization, is computed as a sum of three values (normality score, average value score, and similarity score) taken as absolute values. The subset score is computed and returned in Block 660. The first is a value representative of the results obtained from the normality test. If the subset passes the normality test, this first value is assigned as zero. Otherwise, the value is a positive non-zero, and is chosen depending on the type of normality test. The second value is the average value score. As stated, the average value score is computed as the average of the normal distribution multiplied by the square root of N, where N is the number of points in the subset. All of these values capture how close the subset's distribution is to an expected normal distribution. Finally, the third value used to determine the subset score is the similarity score. In one or more embodiments, the similarity score is defined as the absolute value of one minus the absolute value of the ratio of the standard deviation of the subset compared to the standard deviation of the associated target attribute, or $$\left| 1 - \left| \frac{\sigma_{subset}}{\sigma_{target}} \right| \right|,$$

where σ represents a standard deviation. In some implementations, the values that make up the subset score are modified by a weight before summing them, thereby allowing manipulating their importance with respect to the overall score. It is important to highlight, however, that the choice of weights should not render any value to become of negligible importance. Regardless of the chosen weights, a perfect score should have a value of zero. The subset score is returned with the number of outliers for the subset as the score for the subset in Block 660. If either the absolute value score (Block 630) of the subset is greater than a user-defined average threshold, T, or the subset does not pass the normality test (Block 620), then the subset is rejected.

The goal of the scoring algorithm may be considered in three parts: to determine whether the noise reduction was applied correctly, thereby allowing reconstruction target attributes; provide an objective function for the optimization; and to provide some insight into what is the root cause of incorrect noise reduction, which may be utilized for future iterations in the optimization process.

Scoring is based on investigating four statistical properties associated with the points in a cluster (or a subset of points). These properties are (1) the average of the plurality of differences, (2) their standard deviation, (3) the shape of their distribution, and (4) the number of outliers. All of these properties should match those of the uncertainty of the target attribute as known or provided in the inline inspection tool uncertainties. For example, considering an output metal loss, the uncertainty may be with (1) an average of zero due to equal likelihood of positive and negative error, (2) a standard deviation of 8 (representing 8% thickness loss), and (3) a normal distribution of error. Additionally, (4) the number of outliers will then be one that is consistent with an expected normal distribution. These same statistical properties should be displayed in a perfect correction, though with some deviation depending on the sample size.

In one or more embodiments, the subset score, which will be the objective function of the optimization, is computed as a sum of three values taken as absolute values. The first is a value representative of the results obtained from a normality test. If the subset passes the normality test (e.g. with confidence above a threshold), this first value is assigned as zero. Otherwise, the value is a positive non-zero, and is chosen depending on the type of normality test. The second value is computed as the average of the subset multiplied by the square root of N, where N is the number of points in the cluster. The third value is the similarity score and is defined as the absolute value of one minus the absolute value of the ratio of the standard deviation of the subset compared to the standard deviation of the associated target attribute. All of these values capture how close the subset's distribution is to the expected distribution. In some implementations, these values are modified by a weight before summing them, thereby allowing manipulating their importance with respect to the overall score. It is important to highlight, however, that the choice of weights should not render any value to become of negligible importance. Regardless of the chosen weights, a perfect score should have a value of zero. The subset score is returned with the number of outliers for the subset as the score for the subset.

A score is assigned to each subset. The subsets are all composed of only the data to be reconstructed (i.e., new inline inspection tool data) and not the archival data. As examples of these subsets, they may include a subset of all data, subsets composed of the data within each cluster, subsets of data with a certain binary attribute (e.g., whether a defect is external), subsets of data that are within a range of an attribute (e.g., temperature between 50 to 60 Celsius), some variation and combination of the aforementioned, or others, including randomized subsets of the data irrespective of any attribute.

For a subset to be valid as an objective function in the optimization, it should have a minimum number of data points (e.g., 100), thereby allowing it to display the examined statistical properties with some confidence.

Although other potential inferences can be made considering the statistical properties and shape of the different distribution associated with the plurality of differences, it should still be highlighted that a simple logic of "if-then" is not best suited for the optimization. Since the optimization is multivariate, the aforementioned and other inferences are interconnected and should not be viewed in isolation to make a definitive recommended corrective action. Instead, they offer only a corrective-action with some likelihood of correctness. Therefore, the optimization algorithm should incorporate some form of trial and error, such as is present in the genetic algorithm mentioned. In some embodiments, a pure trial-and-error approach may be used. On other embodiments, the inferences from the statistical analysis may guide the trial-and-error into a desired direction.

Returning to FIG. 4, it is now understood that the scores in Block 416 contain a subset score and number of outliers for each subset considered, where the subsets are defined groupings of the plurality of differences. The scores are compared to the acceptance criterion in Block 418. In one or more embodiments, the acceptance criterion consists of outlier percentage thresholds and upper similarity bounds. In one or more embodiments, the number of outliers for each subset is divided by the number of data points considered in the subset and compared to the outlier percentage threshold. Likewise, in one or more embodiments, the subset score for each subset is compared to an upper similarity bound. In these instances, if the subset score for a given subset is within the range defined by zero and the upper similarity bound, the subset score is accepted.

As depicted in Block 418, failure of any subset to meet the acceptance criterion results in the updating of clustering attribute weights and/or values for the parameters of local shift functions by the cluster optimization algorithm in Block 422. The clustering attribute weight updates, and local shift function parameters, are informed by which subsets have scores that fail to meet the acceptance criterion (Block 418). For example, failure to meet the acceptance criterion for the entirety of the inline inspection tool data indicates overall incorrect clustering and requires changing the weight of some clustering attributes. Whereas failure to meet the acceptance criterion in only a few clusters indicates that the weight of some attributes needs to change locally to the cluster (i.e., updates to the local shift function parameters). Finally, failure of a specific attribute indicates that its overall clustering attribute weight needs to be adjusted. Given the above, it will be known which clustering attribute weights and local shift function parameters need to be adjusted. Updates to the clustering attribute weights and local shift function parameters are output, or proposed by the clustering algorithm, as depicted in Block 424. The updates are applied to the clustering attribute weights and local shift function parameters (i.e., parameters) in Block 406. Again, once the adjustments have been made, clustering is performed anew by the clustering algorithm in Block 408. This procedure is done iteratively until acceptable scores are obtained (Block 418).

While FIGS. 4-6 depict the processes of the noise reduction and validation method disclosed herein, the method is further illustrated with an example. One with ordinary skill in the art will appreciate that the following example is provided solely to aid in the understanding of the noise reduction and validation method and should, by no means, be construed as a limitation on the instant disclosure. FIG. 7A depicts a portion of example inline inspection tool data (702) obtained from the traversal of an inline inspection tool (202) through a pipe. In the example of FIG. 7A, the example inline inspection tool data (702) contains the values for three measured quantities at various locations along the pipe. The measured quantities are classified as either clustering attributes or target attributes. In the present example, for generality, the measured quantities are classified as Clustering Attribute A (708), Clustering Attribute B (710), and Target Attribute A (712). Again, while the present example depicts two clustering attributes and one target attribute, in general, inline inspection tool data (402) need not be configured as such.

Figure 7C:
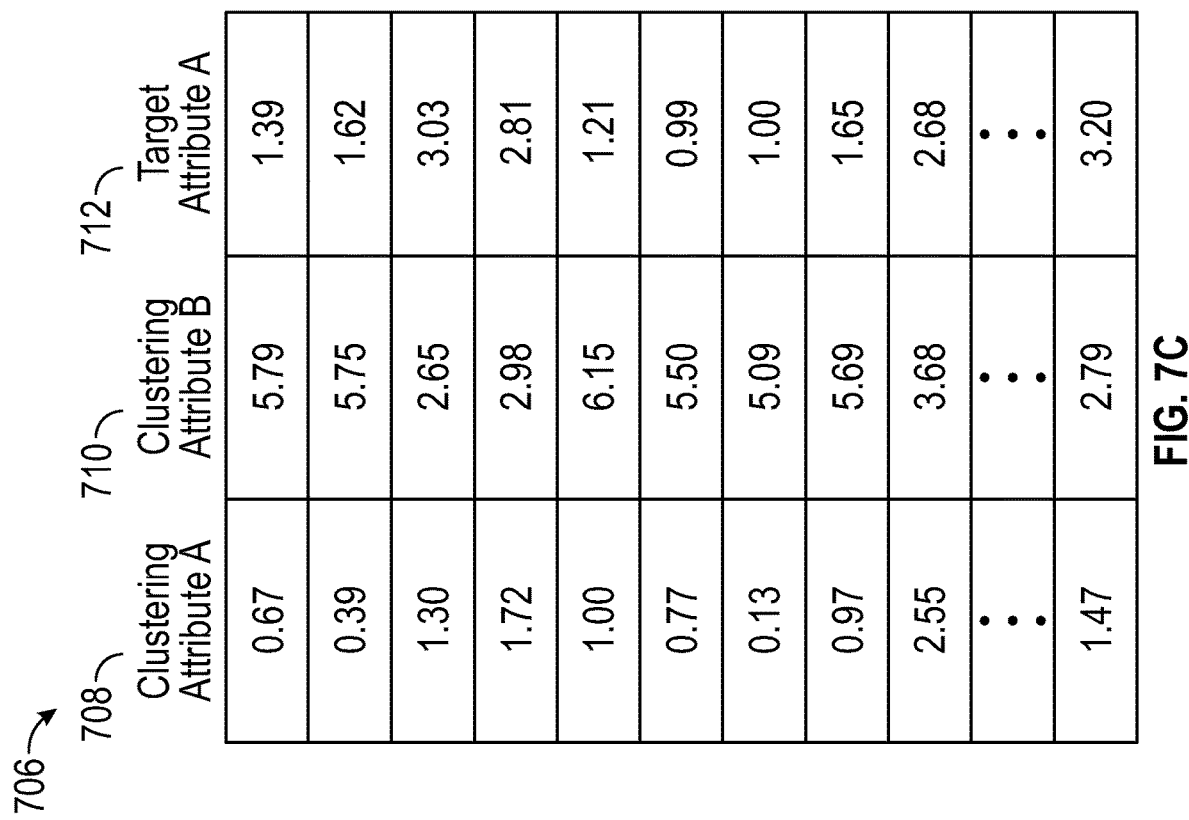
FIG. 7C depicts an example dataset in accordance with one or more embodiments.

Continuing with the example, in accordance with one or more embodiments, the example inline inspection tool data (702) is combined with archival data (404) before clustering. For the present example, the archival data (404) is composed of two data sets, namely. Dataset A (704) and Dataset B (706). Portions of Dataset A (704) and Dataset B (706) are depicted in FIGS. 7B and 7C, respectively. As seen in FIG. 7B, Dataset A (704) contains measured values for Clustering Attribute A (708), Clustering Attribute B (710), Target Attribute A (712), and another clustering attribute, Clustering Attribute C (714). Because Clustering Attribute C (714) is not part of the example inline inspection tool data (702), it will not be considered during clustering. That is, in general, the inline inspection tool data and archival data (404) can have disparate data so long as they share at least one clustering attribute. Finally, as seen in FIG. 7C, Dataset B (706) contains measured values for Clustering Attribute A (708), Clustering Attribute B (710), and Target Attribute A (712). Again, it is emphasized that Dataset A (704) and Dataset B (706) can originate from pipes other than the pipe associated with the example inline inspection tool data (702).

The noise reduction and validation method will identify clusters of data points in the inline inspection tool data and archival data (404) while only considering the shared clustering attributes. For the present example, only two clustering attributes (Clustering Attribute A (708) and Clustering Attribute B (710)) are shared between the example inline inspection tool data (702), Dataset A (704), and Dataset B (706).

Using initial clustering attribute weights and local shift function parameters (e.g., weights for Clustering Attribute A (706) and Clustering Attribute B (708) each equal one), the example inline inspection tool data (702) and archival data (404) (i.e., Dataset A (704) and Dataset B (706) for the present example) are clustered by a clustering algorithm.

Continuing with the example, each data point in the example inline inspection tool data has its respective cluster center subtracted from its value forming a plurality of differences (i.e., one difference value for each data point in the example inline inspection tool data). The plurality of differences is then grouped into at least one subset. The scoring algorithm considers the average of each subset, the normality of each subset (not shown), and the number of outliers when applied to the target attribute. The scoring algorithm is informed by the inline inspection tool uncertainties. User-defined thresholds used in scoring may be uniquely prescribed for each subset.

For the present example, it is assumed that the scores of all of the subsets meet the acceptance criterion (Block 418). As such, updating clustering attribute weights and data point weights is not required and Target Attribute A (712) of the example inline inspection tool data (702) is reconstructed (Block 420). Reconstruction consists of altering the value of the target attribute to the average target attribute value of its associated cluster. FIG. 8, again, depicts a portion of the example inline inspection tool data (702). However, in FIG. 8 each data point has a cluster assignment (804) and is assigned to either Cluster 1 or Cluster 2 according to the clustering algorithm. In the present example, the average target attribute value for Cluster 1 is 2.92 and the average target attribute value for Cluster 2 is 0.97. Thus, the Reconstructed Target Attribute A (806) alters the value of Target Attribute A (712) to either 2.92 or 0.97 according to the cluster assignment (804) of the data point.

Figure 9:
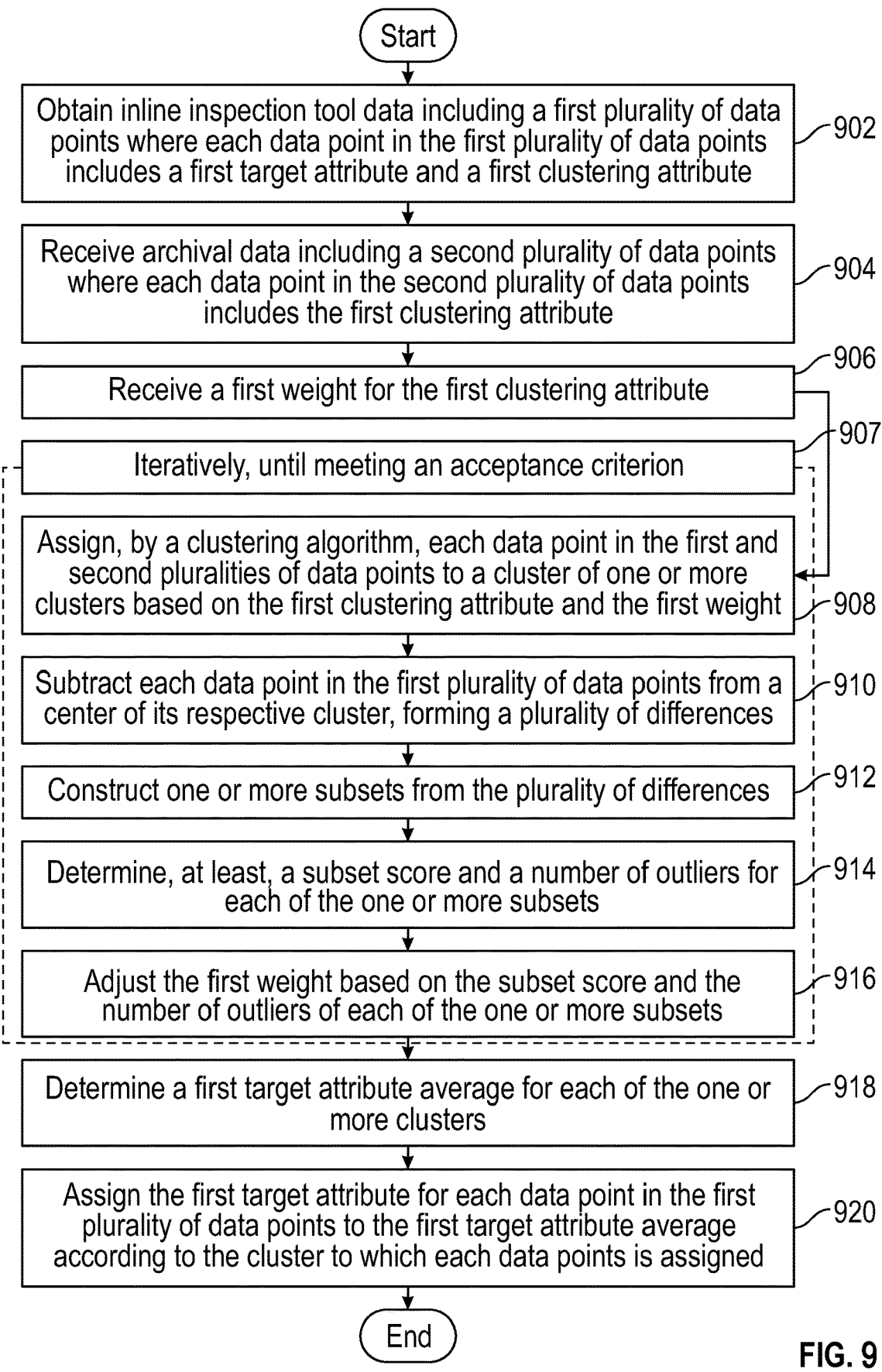
FIG. 9 depicts a flowchart in accordance with one or more embodiments.

FIG. 9 depicts a flowchart summarizing the steps and processes associated with the noise reduction and validation method, in accordance with one or more embodiments. As depicted in Block 902, inline inspection tool data is obtained from an inline inspection tool (202) traversing through a pipe. In one or more embodiments, the inline inspection tool data is stored on the inline inspection tool (202) using an on-board storage medium. The inline inspection tool data includes a first plurality of data points where each data point is composed of at least a first target attribute and a first clustering attribute. In Block 904, archival data (404) is received. In one or more embodiments, the archival data (404) is stored on the inline inspection tool (202) using an on-board storage medium. The archival data (404) is composed of a second plurality of data points. Each data point in the second plurality of data points includes, at least, a value for the first clustering attribute. In Block 906, a first weight is received for the first clustering attribute. In one or more embodiments, a local shift function parameterized by one or more local shift function parameters may also be supplied, by a user, for the first clustering attribute. In this case, the initial parameters values (i.e., a first parameter set) may be received in Block 906.

As depicted in Block 907, the steps and processes enclosed by Blocks 908 through 916 are performed iteratively until meeting a user-defined acceptance criterion. The acceptance criterion defines the scores that must be met by various subsets of the inline inspection tool data. In accordance with one or more embodiments, the acceptable scores defined by the acceptance criterion can differ between subsets. In Block 908, a clustering algorithm is used to assign each data point in the first and second pluralities of data points to a cluster of one or more clusters. In one or more embodiments, the clustering algorithm identifies an optimal number of clusters. In other embodiments, a user supplies a number of clusters. The clustering algorithm determines the assignment of data points to clusters based on the first clustering attribute and the first weight. In one or more embodiments, additional clustering attributes are included in the first and second pluralities of data. In these cases, a clustering attribute weight is provided for each of the additional clustering attributes and the clustering algorithm makes cluster assignments based on all of the clustering attributes and their associated clustering attribute weights. Once each data point in the first and second pluralities of data points has been assigned to a cluster by the clustering algorithm, the center of each cluster is determined. In Block 910, for each data point in the first plurality of data points (i.e., the inline inspection tool data), the center of its respective cluster is subtracted from the data point. The result of the subtraction operation applied to each data point in the first plurality of data points results in a plurality of differences. In one or more embodiments, the plurality of differences is only based on the first target attribute. That is, the plurality of differences consists of the subtraction of target attribute center of each cluster from the associated target attribute value of the first plurality of data points. In Block 912, one or more subsets are constructed from the plurality of differences. Subsets may include, but are not limited to: groupings of the plurality of differences by clustering attribute; and groupings of the plurality of differences by cluster and clustering attribute. In Block 914, the average of each subset is determined. Further, in Block 914, the number of outliers in each subset is determined.

In one or more embodiments, the number of outliers is determined using the expected standard deviation of the measuring device responsible for collecting the data, where the standard deviation(s) is included in, or can be computed with, the inline inspection tool uncertainties. In one or more embodiments, the normality of each subset is assessed with a normality test and a subset score is computed for each subset. In Block 916, the first weight is adjusted, if needed, based on the averages and number of outliers in the subsets. If additional clustering attributes are used, their associated weights may also be adjusted. Further, in one or more embodiments, local shift function parameters may be adjusted according to the results of Block 914. The processes of Blocks 908 through 916 are performed iteratively until an acceptance criterion is met (Block 907). In one or more embodiments, the acceptance criterion requires that each of the subsets have an absolute average value below an average threshold and a normalized number of outliers below an outlier percentage threshold. In one or more embodiments, the acceptance criterion may impose additional requirements on the subset score of subsets and the minimum number of difference values (or data points) included in a cluster. Once the acceptance criterion is met, a first target attribute average is computed for each of the one or more clusters, as shown in Block 918. Simply put, for each cluster, the average of the first target attribute is computed.

Finally, in Block 920, the inline inspection tool data is reconstructed by assigning the first target attribute for each data point in the first plurality of data points to the first target attribute average according to the cluster to which each data point is assigned. In one or more embodiments, a well integrity management plan is determined based on the reconstructed data. For example, the first target attribute may be a measurement of the average or total thickness of a pipe. Therefore, the reconstructed data serves as a denoised indicator of areas of the pipe with corrosion or defects. The well integrity management plan may be tailored according to the detected corrosion. The well integrity management plan may include identifying maintenance and repair strategies and/or adjusting well operational and production settings to maximize hydrocarbon production.

Figure 10:
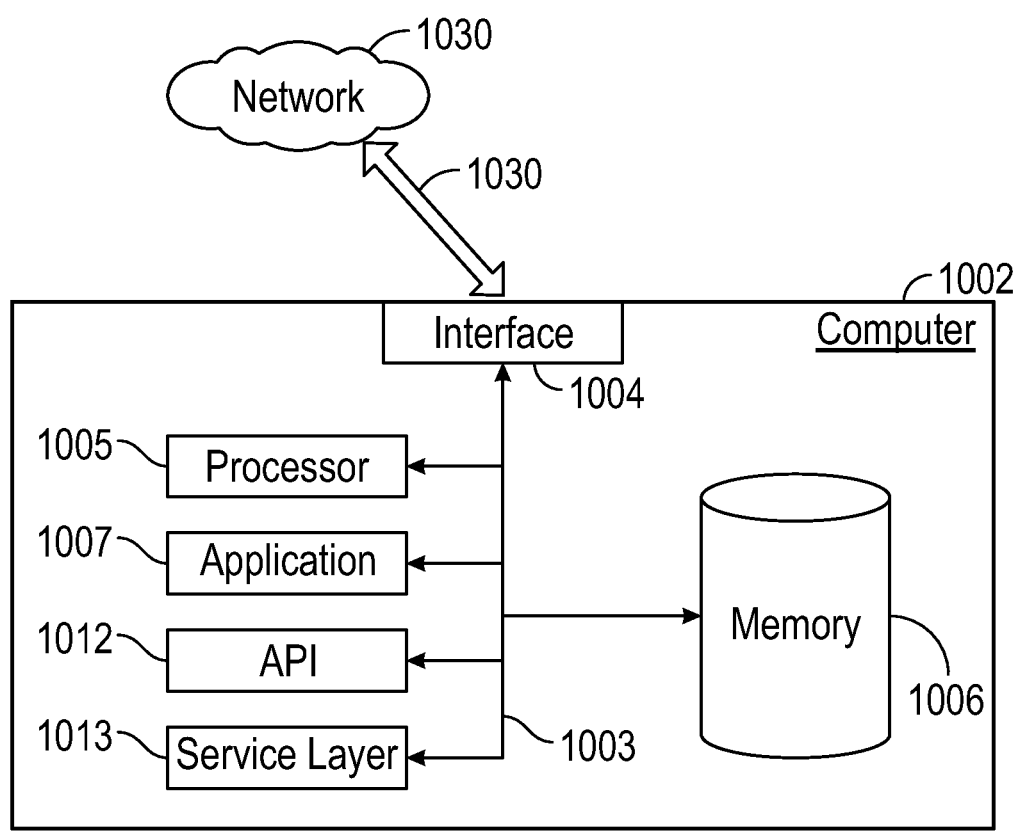
FIG. 10 depicts a computing system in accordance with one or more embodiments.

FIG. 10 further depicts a block diagram of a computer system (1002) (e.g., the pressure control system) used to provide computational functionalities associated with the methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a GUI.

The computer (1002) can serve in a role as a client, network component, a server, a database or other persistency, or any other component (or a combination of roles) of a computer system for performing the subject matter described in the instant disclosure. In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). The memory may be a non-transitory computer readable medium. For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
    deploying an inline inspection tool in a pipe, the inline inspection tool comprising at least one sensor configured to measure a first target attribute in the pipe;
    obtaining inline inspection tool data from the inline inspection tool comprising a first plurality of data points wherein each data point in the first plurality of data points comprises the first target attribute and a first clustering attribute;
    receiving archival data comprising a second plurality of data points wherein each data point in the second plurality of data points comprises the first clustering attribute;
    receiving a first weight and first local shift function parameterized by a first set of parameters for the first clustering attribute;
    iteratively, until meeting an acceptance criterion:
        assigning, by a clustering algorithm, each data point in the first and second pluralities of data points to a cluster of one or more clusters based on the first clustering attribute scaled using the first weight and the first local shift function;
        subtracting a center of each of the one or more clusters from the first target attribute of each data point in the first plurality of data points, according to the respective cluster of each data point in the first plurality of data points, forming a plurality of differences;
        constructing one or more subsets from the plurality of differences;
        determining, at least, a subset score and a number of outliers for each of the one or more subsets, wherein the subset score of a given subset is composed of a normality score that indicates the normality of the given subset, an average value score that is based on the average of the given subset, and a similarity score that is based on the ratio of a standard deviation of the given subset and a standard deviation of the first target attribute of the first plurality of data points; and
        adjusting the first weight and the first set of parameters based on the subset score and the number of outliers of each of the one or more subsets;
    determining a first target attribute average for each of the one or more clusters;
    reconstructing the first target attribute of each data point in the first plurality of data points by assigning the first target attribute for each data point to the first target attribute average according to the cluster to which each data point is assigned;
    determining an area of corrosion based on the first plurality of data points with reconstructed first target attributes; and
    repairing the area of corrosion.

2. The method of claim 1, wherein each data point in the first plurality of data points further comprises a second clustering attribute, and wherein each data point in the second plurality of data points further comprises a second clustering attribute.

3. The method of claim 1, further comprising:
    determining a well integrity management plan based on the first target attribute.

4. The method of claim 1, wherein:
the acceptance criterion comprises an average threshold and an outlier threshold for each of the one or more subsets,
the outlier threshold is based on an expected number of outliers according to a standard deviation of the first target attribute and a number of data points in the given subset,
the average value score is compared to the average threshold, and
the number of outliers of the given subset is compared to the outlier threshold.

5. The method of claim 1, wherein the clustering algorithm is the K-means algorithm.

6. The method of claim 1, further comprising:
receiving an uncertainty or standard deviation of the first target attribute of the first plurality of data points according to a measurement accuracy of the inline inspection tool.

7. The method of claim 2, further comprising:
receiving a second weight and a second local shift function parameterized by a second set of parameters for the second clustering attribute; and
when assigning, by the clustering algorithm, each data point in the first and second pluralities of data points to a cluster of one or more clusters, the clustering algorithm uses the first clustering attribute, the second clustering attribute, the first clustering weight, the second clustering weight, the first local shift function, and the second local shift function.

8. A non-transitory computer-readable memory comprising computer-executable instructions stored thereon that, when executed on a processor, cause the processor to perform:
obtaining inline inspection tool data using an inline inspection tool comprising at least one sensor configured to measure a first target attribute in the pipe, wherein the inline inspection tool data comprises a first plurality of data points wherein each data point in the first plurality of data points comprises the first target attribute and a first clustering attribute;
receiving archival data comprising a second plurality of data points wherein each data point in the second plurality of data points comprises the first clustering attribute;
receiving a first weight and a first local shift function parameterized by a first set of parameters for the first clustering attribute;
iteratively, until meeting an acceptance criterion:
assigning, by a clustering algorithm, each data point in the first and second pluralities of data points to a cluster of one or more clusters based on the first clustering attribute scaled using and the first weight and the first local shift function;
subtracting a center of each of the one or more clusters from the first target attribute of each data point in the first plurality of data points, according to the respective cluster of each data point in the first plurality of data points, forming a plurality of differences;
constructing one or more subsets from the plurality of differences;
determining, at least, a subset score and a number of outliers for each of the one or more subsets, wherein the subset score of a given subset is composed of a normality score that indicates the normality of the given subset, an average value score that is based on the average of the given subset, and a similarity score that is based on the ratio of a standard deviation of the given subset and a standard deviation of the first target attribute of the first plurality of data points; and
adjusting the first weight and the first set of parameters based on the subset score and the number of outliers of each of the one or more subsets;
determining a first target attribute average for each of the one or more clusters;
reconstructing the first target attribute of each data point in the first plurality of data points by assigning the first target attribute for each data point to the first target attribute average according to the cluster to which each data point is assigned; and
determining an area of corrosion based on the first plurality of data points with reconstructed first target attributes, wherein
the area of corrosion is repaired in response to determining the area of corrosion.

9. The non-transitory computer-readable memory of claim 8, wherein each data point in the first plurality of data points further comprises a second clustering attribute, and wherein each data point in the second plurality of data points further comprises a second clustering attribute.

10. The non-transitory computer-readable memory of claim 8, wherein:
the acceptance criterion comprises an average threshold and an outlier threshold for each of the one or more subsets,
the outlier threshold is based on an expected number of outliers according to a standard deviation of the first target attribute and a number of data points in the given subset,
the average value score is compared to the average threshold, and
the number of outliers of the given subset is compared to the outlier threshold.

11. The non-transitory computer-readable memory of claim 8, wherein the clustering algorithm is the K-means algorithm.

12. The non-transitory computer-readable memory of claim 8, further comprising computer-executable instructions that cause the processor to perform:
receiving an uncertainty or standard deviation of the first target attribute of the first plurality of data points according to a measurement accuracy of the inline inspection tool.

13. The non-transitory computer-readable memory of claim 9, further comprising computer-executable instructions that cause the processor to perform:
receiving a second weight and a second local shift function parameterized by a second set of parameters for the second clustering attribute; and
when assigning, by the clustering algorithm, each data point in the first and second pluralities of data points to a cluster of one or more clusters, the clustering algorithm uses the first clustering attribute, the second clustering attribute, the first clustering weight, the second clustering weight, the first local shift function, and the second local shift function.

14. A system, comprising:
an inline inspection tool comprising at least one sensor configured to measure a first target attribute in a pipe;

a well integrity management system;
the pipe; and
a computer comprising on or more computer processors and a non-transitory computer readable medium, configured to:
  obtain inline inspection tool data from the inline inspection tool upon traversing the pipe, the inline inspection tool data comprising a first plurality of data points wherein each data point in the first plurality of data points comprises the first target attribute and a first clustering attribute;
  receive archival data comprising a second plurality of data points wherein each data point in the second plurality of data points comprises the first clustering attribute;
  receive a first weight and a first local shift function parameterized by a first set of parameters for the first clustering attribute;
  iteratively, until meeting an acceptance criterion:
    assign, by a clustering algorithm, each data point in the first and second pluralities of data points to a cluster of one or more clusters based on the first clustering attribute scaled using the first weight and the first local shift function;
    subtract a center of each of the one or more clusters from the first target attribute of each data point in the first plurality of data points, according to the respective cluster of each data point in the first plurality of data points, forming a plurality of differences;
    construct one or more subsets from the plurality of differences;
    determine, at least, a subset score and a number of outliers for each of the one or more subsets, wherein the subset score of a given subset is composed of a normality score that indicates the normality of the given subset, an average value score that is based on the average of the given subset, and a similarity score that is based on the ratio of a standard deviation of the given subset and a standard deviation of the first target attribute of the first plurality of data points; and
    adjust the first weight and the first set of parameters based on the subset score and the number of outliers of each of the one or more subsets;
  determine a first target attribute average for each of the one or more clusters;
  reconstruct the first target attribute of each data point in the first plurality of data points by assigning the first target attribute for each data point to the first target attribute average according to the cluster to which each data point is assigned; and
  determining an area of corrosion based on the first plurality of data points with reconstructed first target attributes,
  wherein the area of corrosion is repaired in response to determining the area of corrosion.

15. The system of claim 14, wherein each data point in the first plurality of data points further comprises a second clustering attribute, and wherein each data point in the second plurality of data points further comprises a second clustering attribute.

16. The system of claim 14, wherein the computer is further configured to:
  determine, with the well integrity management system, a well integrity management plan based on the first target attribute.

17. The system of claim 14, wherein:
  the acceptance criterion comprises an average threshold and an outlier threshold for each of the one or more subsets,
  the outlier threshold is based on an expected number of outliers according to a standard deviation of the first target attribute and a number of data points in the given subset,
  the average value score is compared to the average threshold, and
  the number of outliers of the given subset is compared to the outlier threshold.

18. The system of claim 15, wherein the computer is further configured to:
  receive a second weight and a second local shift function parameterized by a second set of parameters for the second clustering attribute; and
  when assigning, by the clustering algorithm, each data point in the first and second pluralities of data points to a cluster of one or more clusters, the clustering algorithm uses the first clustering attribute, the second clustering attribute, the first clustering weight, the second clustering weight, the first local shift function, and the second local shift function.

* * * * *